United States Patent
Sakai et al.

(10) Patent No.: US 8,891,771 B2
(45) Date of Patent: Nov. 18, 2014

(54) COMMUNICATION APPARATUS, COMMUNICATION METHOD, AND COMPUTER PROGRAM

(75) Inventors: Tatsuhiko Sakai, Tokyo (JP); Fumihide Goto, Naka-gun (JP); Kenichi Fujii, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 476 days.

(21) Appl. No.: 13/061,124

(22) PCT Filed: Jul. 17, 2009

(86) PCT No.: PCT/JP2009/063302
§ 371 (c)(1),
(2), (4) Date: Feb. 25, 2011

(87) PCT Pub. No.: WO2010/024074
PCT Pub. Date: Mar. 4, 2010

(65) Prior Publication Data
US 2011/0188658 A1    Aug. 4, 2011

(30) Foreign Application Priority Data

Aug. 29, 2008 (JP) ................. 2008-222795
Oct. 31, 2008 (JP) ................. 2008-282436

(51) Int. Cl.
| | | |
|---|---|---|
| H04L 9/08 | (2006.01) | |
| H04L 9/00 | (2006.01) | |
| G06F 15/177 | (2006.01) | |
| G06F 15/173 | (2006.01) | |
| H04L 29/06 | (2006.01) | |
| H04W 12/04 | (2009.01) | |
| H04W 28/18 | (2009.01) | |
| H04W 8/20 | (2009.01) | |
| H04W 84/20 | (2009.01) | |

(52) U.S. Cl.
CPC ............. *H04W 12/04* (2013.01); *H04L 63/205* (2013.01); *H04W 28/18* (2013.01); *H04L 63/065* (2013.01); *H04W 8/205* (2013.01); *H04W 84/20* (2013.01)
USPC .............. 380/278; 380/44; 709/221; 709/224

(58) Field of Classification Search
CPC ... H04L 63/065; H04L 63/205; H04W 12/04; H04W 84/20; H04W 28/18; H04W 8/205
USPC .............................. 380/44, 278; 709/221, 224
See application file for complete search history.

(56) References Cited

U.S. PATENT DOCUMENTS

2006/0268744 A1    11/2006 Sakai
2008/0025295 A1*    1/2008 Elliott et al. .................. 370/356
(Continued)

FOREIGN PATENT DOCUMENTS

EP    1868314 A1    12/2007
EP    2375824 A2    10/2011
(Continued)

OTHER PUBLICATIONS

European Search Report for counterpart European Patent Application No. 09809728.0, dated Jan. 7, 2013.
(Continued)

Primary Examiner — Kambiz Zand
Assistant Examiner — Benjamin Kaplan
(74) Attorney, Agent, or Firm — Carter, DeLuca, Farrell & Schmidt, LLP

(57) ABSTRACT

Communication parameters can be appropriately set without deteriorating user operability even if roles are not determined in advance when automatically setting the communication parameters. The invention includes a communication method when apparatus C newly joins a network formed of apparatuses A and B. The method is characterized by including a step of causing apparatus B to determine whether it belongs to the network in response to press of a button, and to operate as a provider and notify apparatus A of it upon determining that it belongs to the network, and a step of causing apparatus A to transmit, upon receiving the notification, a search response signal containing information on apparatus B in response to a search signal from apparatus C.

13 Claims, 20 Drawing Sheets

(56) References Cited

U.S. PATENT DOCUMENTS

| | | |
|---|---|---|
| 2008/0037444 A1 | 2/2008 | Chhabra |
| 2008/0089300 A1 | 4/2008 | Yee |
| 2008/0273079 A1* | 11/2008 | Campbell et al. ......... 348/14.08 |
| 2010/0020706 A1* | 1/2010 | Fujii ............................. 370/252 |
| 2010/0046394 A1* | 2/2010 | Fujii et al. .................... 370/254 |
| 2010/0203825 A1* | 8/2010 | Goto ................................. 455/7 |

FOREIGN PATENT DOCUMENTS

| | | |
|---|---|---|
| JP | 2006-311139 A | 11/2006 |
| JP | 2007-189301 A | 7/2007 |
| JP | 2007-243434 A | 9/2007 |
| JP | 2007-336010 A | 12/2007 |
| JP | 2008-042882 A | 2/2008 |
| JP | 2008-104076 A | 5/2008 |
| JP | 2008-109581 A | 5/2008 |
| JP | 2008-187348 A | 8/2008 |
| WO | 2008/021077 A2 | 2/2008 |
| WO | 2008/047884 A1 | 4/2008 |
| WO | 2008/050622 A1 | 5/2008 |
| WO | 2008/093817 A1 | 8/2008 |

OTHER PUBLICATIONS

U.S. Appl. No. 13/124,203, filed Apr. 14, 2011, Fumihide Goto.
U.S. Appl. No. 13/122,619, filed Apr. 5, 2011, Fumihide Goto.
U.S. Appl. No. 13/122,558, filed Apr. 4, 2011, Tatsuhiko Sakai.
U.S. Appl. No. 13/120,535, filed Mar. 23, 2011, Fumihide Goto.
U.S. Appl. No. 12/996,484, filed Dec. 6, 2010, Fumihide Goto.
U.S. Appl. No. 12/989,070, filed Oct. 21, 2010, Tatsuhiko Sakai.
U.S. Appl. No. 12/988,781, filed Oct. 20, 2010, Tatsuhiko Sakai.
"Wi-Fi Protected Access Enhanced Security Implementation Based on IEEEP802.11i standard"( http://www.wi-fi.orgwp/wifi-protected), 190 pages.
Wi-Fi Certified for Wi-Fi Protected Setup: Easing the User Experience for Home and Small Office Wi-Fi Networks (http://www.wi-fi.orgwp/wifi-protected) 14 Pages, copyright 2007, 2008.

* cited by examiner

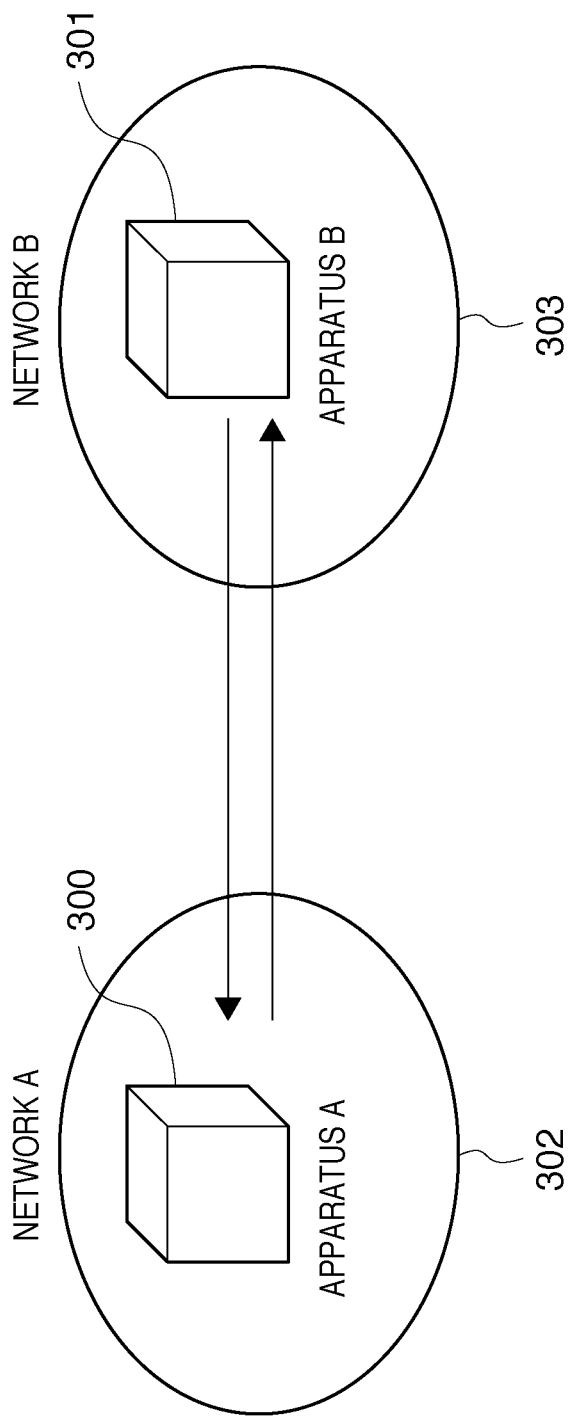

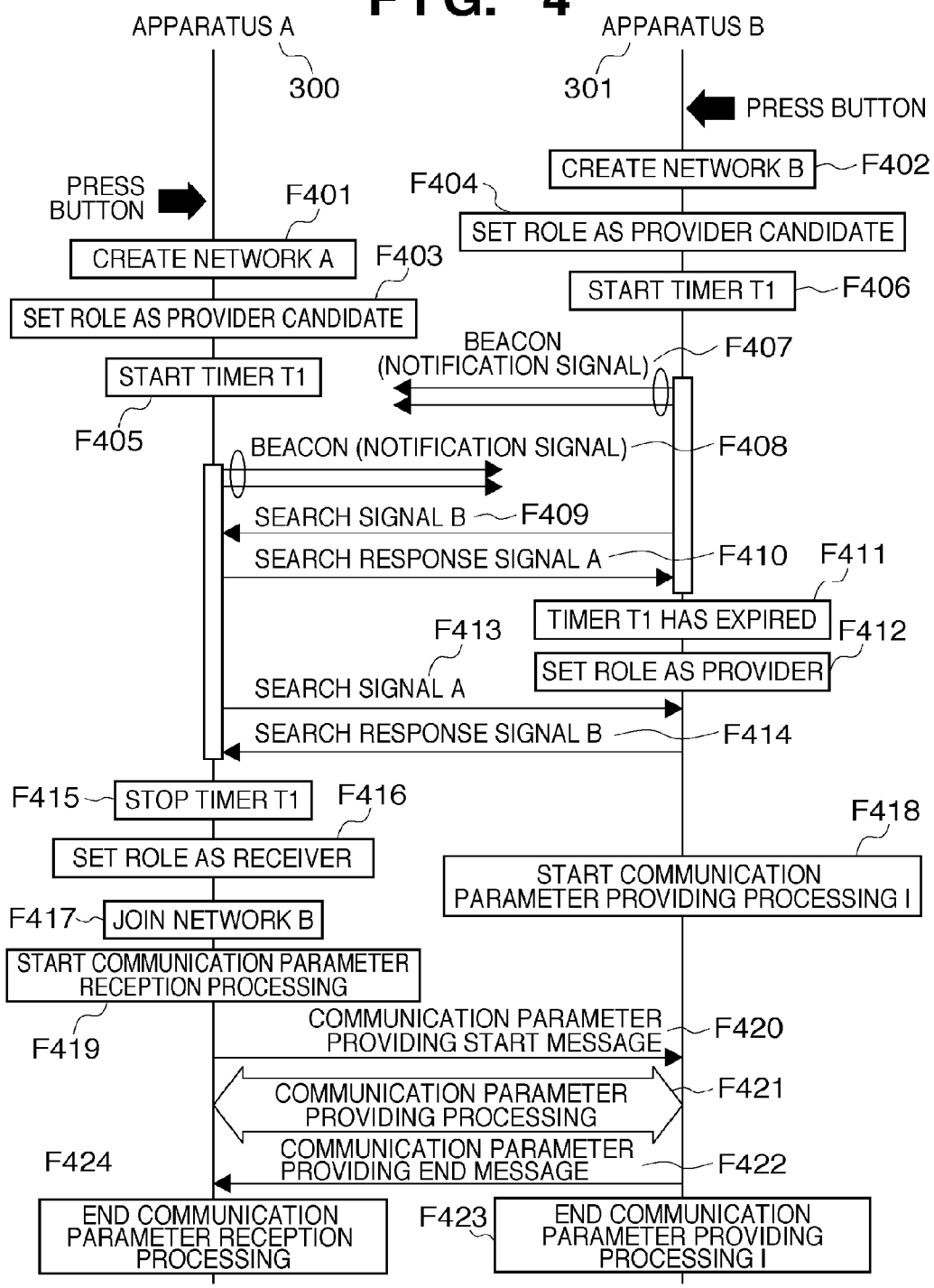

FIG. 10

SUPPORTED AUTHENTICATION/ENCRYPTION METHODS

| AUTHENTICATION METHOD | ENCRYPTION METHOD |
|---|---|
| Open | NO ENCRYPTION |
|  | WEP |
| Shared | WEP |
| WPA | TKIP |
|  | CCMP |
| WPA-PSK | TKIP |
|  | CCMP |
| WPA2 | TKIP |
|  | CCMP |
| WPA2-PSK | TKIP |
|  | CCMP |

FIG. 11

NUMBER OF HELD KEYS

| METHOD | pairwise key | group key | total |
|---|---|---|---|
| IEEE802.11i full spec | n-1 | n+1 | 2n |
| (1) reduce Seq | n-1 | n+1 | 2n |
| (2) reduce Key | n-1 | 1 | n |
| (3) WPA-None | 0 | 1 | 1 |
| (4) WPA Key Exchange over WPS handshake | n-1 | n+1 or 1 | 2n or n |

NUMBER OF TIMES OF KEY EXCHANGE EXECUTED FOR EACH OPPOSING APPARATUS

| METHOD | 4-Way Handshake | Group Key Handshake |
|---|---|---|
| IEEE802.11i full spec | 2 | 2 |
| (1) reduce Seq | 1 | 2 |
| (2) reduce Key | 1 or 2 | 1 |
| (3) WPA-None | 0 | 0 |
| (4) WPA Key Exchange over WPS handshake | 0 | 0 or 1 or 2 |

COMMUNICATION APPARATUS, COMMUNICATION METHOD, AND COMPUTER PROGRAM

TECHNICAL FIELD

The present invention relates to a communication apparatus, a communication method, and a computer program.

BACKGROUND ART

In wireless communication represented by a wireless LAN complying with the IEEE802.11 standard series, there are many setting items to be set in advance. More specifically, the setting items include an SSID as a network identifier, an encryption method, an encryption key, an authentication method, and an authentication key. It is very troublesome for a user to set such communication parameters for wireless communication by manual input.

Various manufacturers have proposed automatic setting methods for easily setting communication parameters in a wireless communication apparatus. In those automatic setting methods, one communication apparatus provides another communication apparatus with communication parameters using a procedure predetermined between these connected communication apparatuses and a message, thereby automatically setting the communication parameters.

Japanese Patent Laid-Open No. 2006-311139 has disclosed an example of communication parameter automatic setting in communication in a wireless LAN ad hoc mode (to be referred to as ad hoc communication hereinafter). In addition, "Wi-Fi CERTIFIED for Wi-Fi Protected Setup Easing the User Experience for Home and Small Office Wi-Fi Networks" (see http://www.wi-fi.orgwp/wifi-protected) (to be referred to as "reference 1" hereinafter) has disclosed Wi-Fi Protected Setup (to be referred to as WPS) as a standard in the industry for communication parameter automatic setting between an access point (base station) and a station (terminal station). Furthermore, "Wi-Fi Protected Access Enhanced Security Implementation Based on IEEEP802.11i standard" (to be referred to as "reference 2" hereinafter) has disclosed Wi-Fi Protected Access (to be referred to as WPA) as a standard in the industry for, for example, an encryption method, an encryption key, an authentication method, and an authentication key in wireless communication.

If the roles of a communication apparatus for providing communication parameters (to be referred to as a provider hereinafter) and a communication apparatus for receiving the communication parameters (to be referred to as a receiver hereinafter) are determined in advance like WPS, the communication parameter transfer direction is uniquely determined.

However, if the roles of the provider and receiver are not determined in advance, it is impossible to uniquely determine the communication parameter transfer direction.

Furthermore, if a plurality of communication apparatuses become providers, a receiver cannot determine from which provider it should receive communication parameters.

In this case, user operability deteriorates when the user has to select one communication apparatus to be a provider and that to be a receiver.

The above problems may arise when a communication apparatus is newly added to a network already built between a plurality of communication apparatuses. In this case, it is desired that a communication apparatus belonging to the network becomes a provider, and the communication apparatus newly joining the network becomes a receiver to receive the communication parameters of the network. If, however, the roles of a provider and receiver are not determined in advance, it is impossible to set appropriate communication parameters in the communication apparatus newly joining the network.

The above problems may occur for not only communication parameters for wireless communication but also those for wired communication or the like which need to be set for communication between apparatuses.

DISCLOSURE OF INVENTION

The present invention has been made in consideration of the above problems.

A communication method according to the present invention includes the following steps. That is, a communication method when a third communication apparatus newly joins a network formed from a plurality of communication apparatuses including first and second communication apparatuses, characterized by comprising: a determination step of causing the first communication apparatus to determine in response to a start instruction of communication parameter setting processing whether the first communication apparatus belongs to the network; a start step of causing the first communication apparatus to start an operation as a provider which provides communication parameters upon determining that the first communication apparatus belongs to the network in the determination step; a notification step of causing the first communication apparatus to notify the second communication apparatus that the operation as the provider is started; a reception step of causing the second communication apparatus to receive the notification in the notification step; and a response step of causing the second communication apparatus to transmit a response signal containing information on the first communication apparatus in response to a provider search signal from the third communication apparatus after reception in the reception step.

According to the present invention, it is possible to appropriately set communication parameters without deteriorating user operability even if roles are not determined in advance when automatically setting the communication parameters.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 is a view showing apparatuses A and B serving as communication apparatuses;

FIG. 4 is a sequence chart showing an example of the processing sequence of communication parameter automatic setting processing executed between apparatuses A and B by pressing setting buttons 106 of apparatuses A and B;

FIG. 10 is a table showing combinations of authentication methods and encryption methods to be adopted;

FIG. 11 shows comparison tables of held keys/key exchange sequences in key exchange algorithms;

BEST MODE FOR CARRYING OUT THE INVENTION

A communication apparatus according to each embodiment of the present invention will be described below in detail with reference to the accompanying drawings. A case in which a wireless LAN system complying with the IEEE802.11 standard series is used will be explained below but the communication mode is not limited to this.

1. Hardware Arrangement of Communication Apparatus

Figure 1:
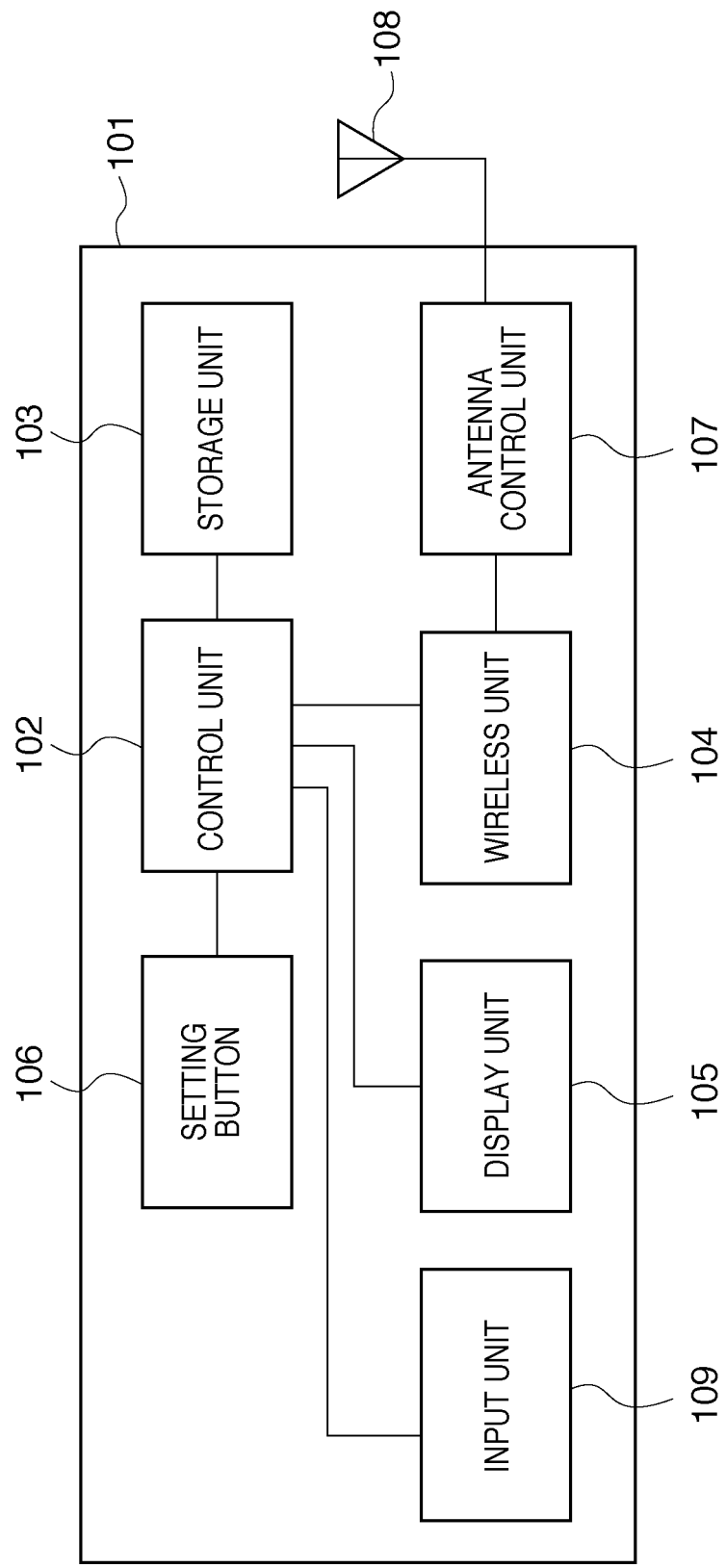
FIG. 1 is a block diagram showing an example of the arrangement of a communication apparatus (provider or receiver) according to an embodiment of the present invention.

The hardware arrangement of a communication apparatus according to an embodiment will be described first. FIG. 1 is a block diagram showing an example of the arrangement of a communication apparatus (provider or receiver) according to the embodiment of the present invention.

Reference numeral 101 denotes a communication apparatus as a whole; and 102, a control unit which controls the communication apparatus as a whole by executing computer programs stored in a storage unit 103. The control unit 102 also controls communication parameter setting with another communication apparatus.

The storage unit 103 stores the computer programs executed by the control unit 102 and various kinds of information such as communication parameters. Various processes (to be described later) in a communication apparatus are implemented when the control unit 102 executes the computer programs stored in the storage unit 103.

Reference numeral 104 denotes a wireless unit for wireless communication; and 105, a display unit which provides various displays and has a function of outputting visually perceivable information like an LCD or LED, or a function of outputting a sound like a loudspeaker.

Reference numeral 106 denotes a setting button which gives a trigger (start instruction) to start communication parameter setting processing. Upon detecting a user pressing of the setting button 106, the control unit 102 performs processing (to be described later).

Reference numeral 107 denotes an antenna control unit; 108, an antenna; and 109, an input unit used for various inputs by the user.

2. Functional Blocks of Communication Apparatus

Figure 2:
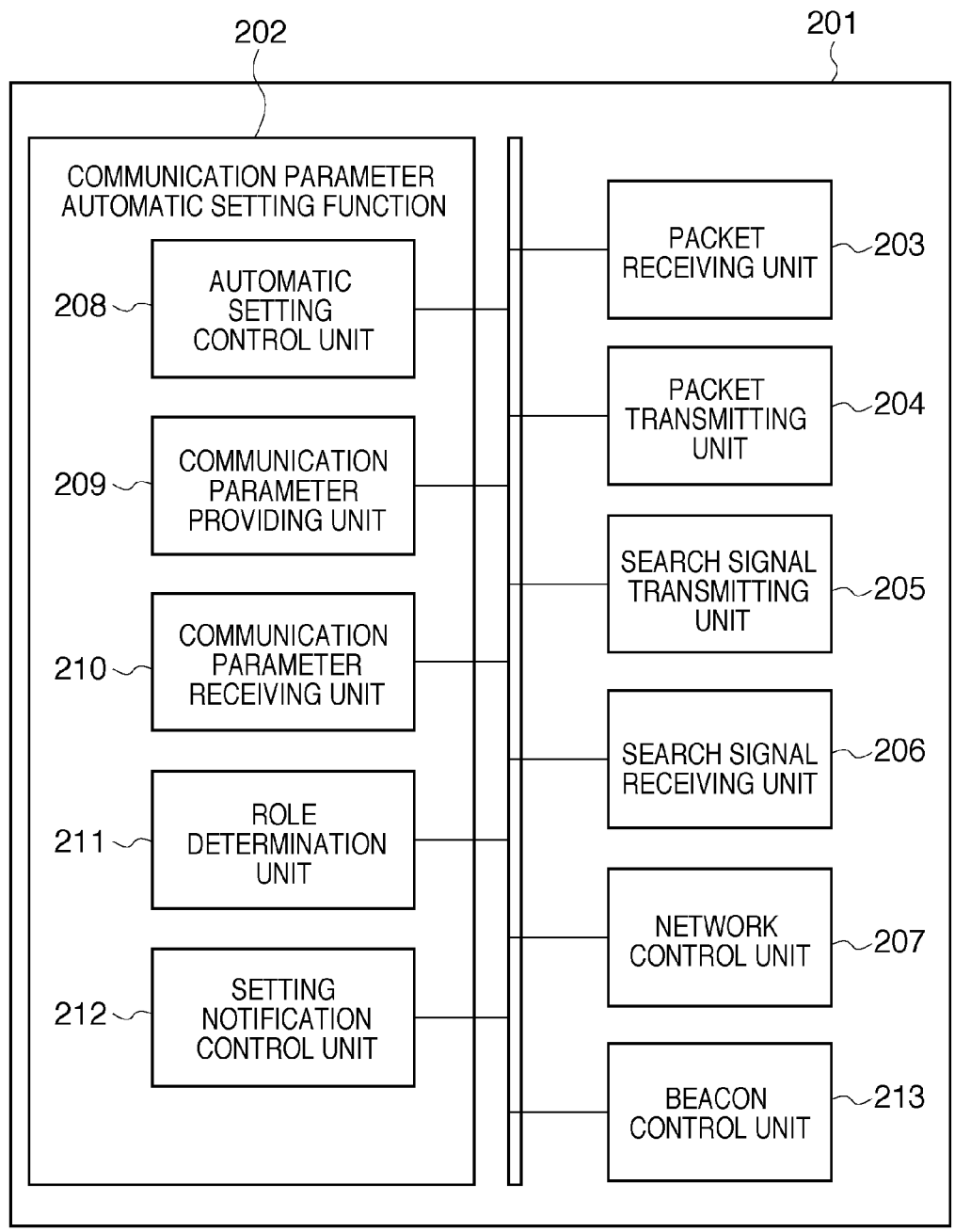
FIG. 2 is a block diagram showing an example of the configuration of software functional blocks executed by communication apparatuses.

FIG. 2 is a block diagram showing an example of the configuration of software functional blocks executed by a communication apparatus in communication parameter automatic setting processing (to be described later).

Reference numeral 201 denotes a communication apparatus as a whole; and 202, a communication parameter automatic setting functional block. In this embodiment, when this functional block operates, communication parameters for wireless communication, such as an SSID as a network identifier, an encryption method, an encryption key, an authentication method, and an authentication key, are automatically set.

Reference numeral 203 denotes a packet receiving unit which receives packets associated with various communications. The packet receiving unit 203 receives a beacon (notification signal). Reference numeral 204 denotes a packet transmitting unit which transmits packets associated with various communications. The packet transmitting unit 204 transmits a beacon. Note that a beacon is added with various kinds of information (information regarding the device itself) on a communication apparatus as a transmission source.

Reference numeral 205 denotes a search signal transmitting unit which controls transmission of a search signal such as a probe request. Note that a probe request can also be referred to as a network search signal for searching for a desired network. The search signal transmitting unit 205 transmits a probe request. The search signal transmitting unit 205 also transmits a probe response as a search response signal to a received probe request.

Reference numeral 206 denotes a search signal receiving unit which controls reception of a search signal such as a probe request from another communication apparatus. The search signal receiving unit 206 receives a probe request. The search signal receiving unit 206 also receives a probe response. Note that a search signal and search response signal are respectively added with various kinds of information (information regarding the device itself) on a communication apparatus as a transmission source.

Reference numeral 207 denotes a network control unit which controls communication connection processing on a network. The network control unit 207 executes wireless communication connection processing on a wireless LAN ad hoc network.

In the communication parameter automatic setting functional block 202, reference numeral 208 denotes an automatic setting control unit which controls various protocols in communication parameter automatic setting processing.

Reference numeral 209 denotes a communication parameter providing unit which provides another communication apparatus with communication parameters. In communication parameter automatic setting processing (to be described later), the communication parameter providing unit 209 performs communication parameter providing processing under the control of the automatic setting control unit 208.

Reference numeral 210 denotes a communication parameter receiving unit which receives communication parameters from another communication apparatus. In communication parameter, automatic setting processing (to be described later), the communication parameter receiving unit 210 executes communication parameter reception processing under the control of the automatic setting control unit 208.

The automatic setting control unit 208 also determines whether an elapsed time from when communication parameter automatic setting processing starts exceeds the time limit of the communication parameter automatic setting processing. Upon determining that the elapsed time exceeds the time limit, the automatic setting control unit 208 controls to abort the automatic setting processing.

Reference numeral 211 denotes a role determining unit which determines roles in communication parameter automatic setting processing.

Reference numeral 212 denotes a setting notification control unit which controls processing associated with notification of the start and end of communication parameter automatic setting processing. The setting notification control unit 212 transmits/receives a start notification message and an end notification message in a provider (to be described later).

Reference numeral 213 denotes a beacon control unit which controls the transmission timing of a beacon (notification signal). A beacon transmission algorithm in an IEEE802.11 wireless LAN ad hoc network will now be explained.

In an ad hoc network, transmission of a beacon is performed, in autonomous distribution, between all communication apparatuses which form the network. A communication apparatus which first created the ad hoc network is supposed to determine the transmission interval of a beacon (beacon period). In general, at an interval of about 100 ms, one of the communication apparatuses transmits a beacon. Note that in an ad hoc network, when one of the communication apparatuses starts to transmit a beacon, a network is formed.

A parameter called a contention window (random number generation range; to be referred to as CW hereinafter) controls the transmission timing of a beacon. Each communication apparatus in a network obtains a random value (CWrand) within the range from zero to CW at the time of transmitting a beacon. A time obtained by multiplying CWrand by a predetermined constant interval (slot time) is defined as a standby time (back off time) before transmitting a beacon.

The standby time before transmitting a beacon is repeatedly decremented by the slot time. When the standby time becomes zero, a beacon is transmitted. If a communication apparatus receives a beacon from another communication apparatus before transmitting a beacon, it aborts beacon transmission processing.

This configuration makes it possible to prevent collision of beacons transmitted from communication apparatuses. Each communication apparatus on an ad hoc network selects a random number between zero and CW. Out of the communication apparatuses which form the network, a communication apparatus which has selected a smallest CWrand transmits a beacon.

For example, if identical CW is set as an initial value in each communication apparatus, the beacon transmission probabilities by the communication apparatuses are equal to each other. Consequently, the numbers of beacon transmissions per unit time by the communication apparatuses are almost equal to each other. In other words, the beacon transmission frequencies (transmission rates) by the communication apparatuses are equal to each other.

On the other hand, if one communication apparatus on the network sets CW to a value smaller than the initial value, the beacon transmission probability by this communication apparatus becomes higher than that by any other communication apparatus. That is, CW can be a parameter to determine the beacon transmission probability or that to determine the number of beacon transmissions per unit time. Alternatively, CW can be a parameter to determine the transmission rate of a beacon transmitted by each communication apparatus.

In other words, CW can be a parameter to determine a beacon transmission timing, or that to determine a standby time before transmitting a beacon.

It is possible to change the value of CW within the range from CWmin (a minimum value) to CWmax (a maximum value). If the value of CW is set to CWmin, the number of beacon transmissions per unit time becomes maximum. In each communication apparatus, CWinit (>CWmin) is set as an initial value, and thus a beacon is transmitted using the initial value while no communication parameter automatic setting processing is executed.

3. Communication Parameter Automatic Setting Processing Example 1

Details of communication parameter automatic setting processing will be described.

<3.1 Network Configuration>

First, the configuration of a network in which communication parameter automatic setting processing is performed will be described.

FIG. 3 is a view showing a communication apparatus A 300 (to be referred to as apparatus A hereinafter) and a communication apparatus B 301 (to be referred to as apparatus B hereinafter) as communication apparatuses according to this embodiment. These communication apparatuses have the hardware arrangement of FIG. 1 and the functional configuration of FIG. 2 which have been described above.

Furthermore, neither of apparatuses A and B are determined to serve as a communication parameter provider or receiver. Apparatus A creates a network A 302 (to be referred to as network A hereinafter), and apparatus B creates a network B 303 (to be referred to as network B hereinafter).

Apparatuses A and B find each another, and determine which of them becomes a provider. With this processing, a communication apparatus which becomes a provider provides communication parameters for the other communication apparatus which becomes a receiver.

Networks A and B are ad hoc networks created by apparatuses A and B, respectively. An ad hoc network is called IBSS (Independent Basic Service Set), and each network is discriminated by a BSSID as a network identifier.

Note that a BSSID is a network identifier having a random value generated by a communication apparatus which creates a network. Note that an SSID is a network identifier which can be preset in a communication apparatus or can be set to an arbitrary value by the user, and is different from a BSSID. As is apparent from the above description, a BSSID is not a communication parameter provided from a provider to a receiver by executing communication parameter automatic setting processing.

<3.2 Processing Sequence of Communication Parameter Automatic Setting Processing>

FIG. 4 is a sequence chart showing an example of the processing sequence of communication parameter automatic setting processing executed between apparatuses A and B by pressing the setting buttons 106 of apparatuses A and B.

When the setting buttons 106 of apparatuses A and B are pressed, apparatus A creates unique network A (F401) and apparatus B creates unique network B (F402). Assume that the setting button 106 of apparatus B is pressed first and the network of apparatus B is created first.

The operation role (to be referred to as a role hereinafter) of apparatus A or B is set to "provider candidate" indicating that the role is not yet determined to be a provider or receiver (F403 or F404). Apparatus A or B starts a timer T1 indicating a time elapsed until the role is determined (F405 or F406).

In the corresponding created network, apparatus A or B transmits a beacon (notification signal) containing an information element indicating that it has a communication parameter automatic setting processing function (F407 or F408). Alternatively, apparatus A or B transmits a beacon (notification signal) containing an information element to notify that the automatic setting processing is in progress (F407 or F408). The beacon can also contain an information element to indicate that the current role is "provider candidate".

Since the beacons (F407 and F408) contain the BSSIDs of networks A and B, which are different from each other, a communication apparatus which has received the beacon can recognize a network to which a communication apparatus that has transmitted the beacon belongs.

Then, apparatus B transmits search signal B (F409). Like the beacon, search signal B contains an information element indicating that apparatus B has the communication parameter automatic setting processing function. Search signal B also contains an information element indicating that the automatic setting processing is in progress and that indicating the current role "provider candidate".

Upon receiving search signal B (F409) transmitted from apparatus B, apparatus A transmits search response signal A (F410) to apparatus B. Like search signal B, search response signal A (F410) contains an information element indicating that apparatus A has the communication parameter automatic setting processing function. Search response signal A also contains an information element indicating that the automatic setting processing is in progress and that the current role is "provider candidate".

If apparatus B detects no provider and then the timer T1 expires (F411), apparatus B sets its role as a provider (F412).

Subsequently, apparatus A transmits search signal A (F413). Search signal A (F413) transmitted from apparatus A contains an information element indicating that apparatus A has the communication parameter automatic setting processing function. Furthermore, search signal A contains an information element indicating that the automatic setting processing is in progress and that indicating the current role "provider candidate".

Upon receiving search signal A (F413) transmitted from apparatus A, apparatus B transmits search response signal B (F414) to apparatus A. Like the beacon and search response signal A, search response signal B (F414) contains an information element indicating that apparatus B has the communication parameter automatic setting processing function. Search response signal B also contains an information element indicating that the automatic setting processing is in progress and that indicating the current role.

Since the role of apparatus B has been determined to be "provider" at this time, search response signal B contains an information element indicating the current role "provider". In addition to the information element indicating "provider", search response signal B may be added with an information element indicating that apparatus B can provide communication parameters.

Upon receiving search response signal B (F414) transmitted from apparatus B, apparatus A checks that the role of apparatus B is a provider, and can provide communication parameters.

Then, apparatus A stops the timer T1 (F415), sets its role as a receiver (F416), and joins network B created by apparatus B (F417).

This processing allows to transmit/receive, between apparatuses A and B, communication messages (protocol messages) exchanged in communication parameter automatic setting protocol processing. As a result, apparatus B starts communication parameter providing processing I (F418), and apparatus A starts communication parameter reception processing (F419).

Note that the automatic setting protocol processing transmits/receives various predetermined communication messages to provide communication parameters from a provider to a receiver. In WPS, the protocol processing is called a registration protocol (see reference 1).

For descriptive convenience, in this embodiment, assume that the receiver transmits a communication parameter providing start message (F420) to the provider, and the provider performs communication parameter providing processing for the receiver in response to the message (F421). Assume also that upon completion of the providing processing, the provider transmits a communication parameter providing end message (F422).

When apparatus A joins network B (F417), communication parameters such as an encryption key and authentication key are not set in apparatus A yet. It is, therefore, impossible to perform communication using encryption and authentication between apparatuses A and B.

In the above description, the search signals and search response signals are used to determine the roles of apparatuses A and B. However, it is also possible to determine the roles using the information elements contained in the mutually transmitted/received beacons instead of transmitting/receiving the search signals and search response signals.

Referring back to FIG. 4, apparatus A joins the network created by apparatus B (F417). Upon start of the communication parameter reception processing I (F419), apparatus A transmits the communication parameter providing start message to apparatus B (F420). Upon receiving the communication parameter providing start message, apparatus B serving as a provider executes the communication parameter providing processing for apparatus A (F421). Upon completion of the communication parameter providing processing, apparatus B transmits the communication parameter providing end message to apparatus A (F422). This ends the communication parameter providing processing I and the communication parameter reception processing (F423 and F424), and apparatuses A and B thus share the communication parameters.

Consequently, apparatuses A and B can execute communication connection processing using the shared communication parameters.

By starting the communication connection processing upon completion of the communication parameter providing processing I, it is possible to perform communication between apparatuses A and B without requiring any user operation. In this case, a communication apparatus may transmit a connection request signal to explicitly indicate that the communication connection processing has started.

Unlike an infrastructure mode, no association processing is executed in an ad hoc mode. However, by receiving a connection request signal, it is possible to quickly recognize a communication apparatus which has made a connection request.

In this embodiment, for example, apparatus B transmits the communication parameters of network B to apparatus A, and communication connection processing is executed using the communication parameters. In this case, by causing apparatus A to transmit a connection request signal to apparatus B, apparatus B can recognize that apparatus A has joined network B, and easily know the number of apparatuses belonging to network B.

The user may confirm whether the communication connection processing should be start before it begins, and the communication connection processing may begin in response to a user operation. For example, upon completion of the communication parameter providing processing I, the display unit 105 may provide a display to prompt the user to select whether to start the communication connection processing. When the user inputs via the input unit 109, the communication connection processing may start.

Furthermore, apparatus B may transmit a communication parameter indicating a network different from network B to apparatus A. For example, apparatus B may provide apparatus A with communication parameters for communication in network C. After that, apparatuses A and B may perform communication in network C. In this case, apparatus A or B uses, as a trigger, detection of the other apparatus to start communication connection processing.

<3.3 Procedure of Communication Control Processing in Each Communication Apparatus>

The procedure of communication control processing in each communication apparatus when performing communication parameter automatic setting processing will be described next.

Figure 5A:
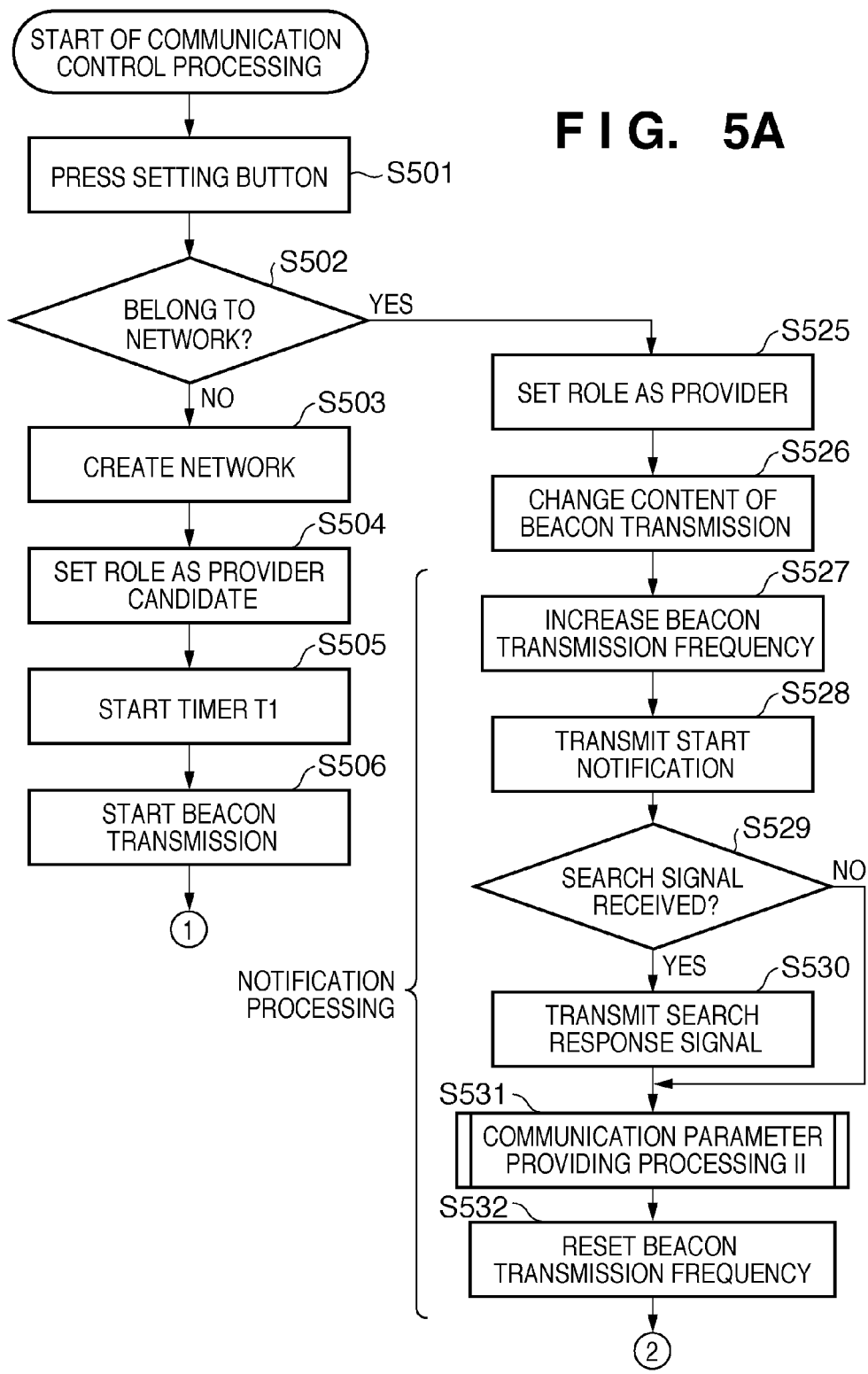
FIGS. 5A to 5C are flowcharts illustrating the procedure of communication control processing when the setting buttons 106 of apparatuses A and B are pressed, and apparatuses A and B respectively determine to operate as a provider or receiver to execute communication parameter automatic setting processing.
Figure 5B:
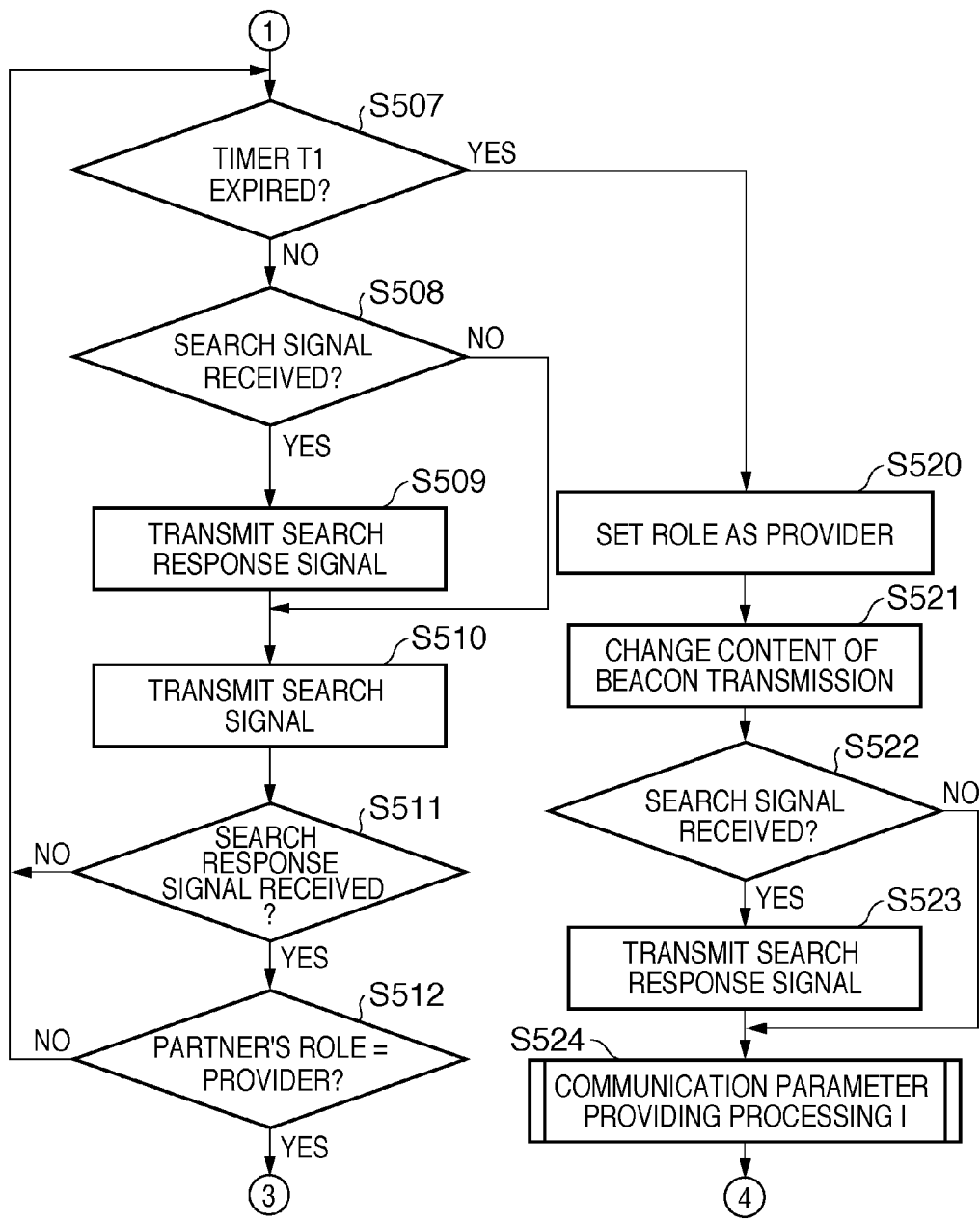
Figure 5C:
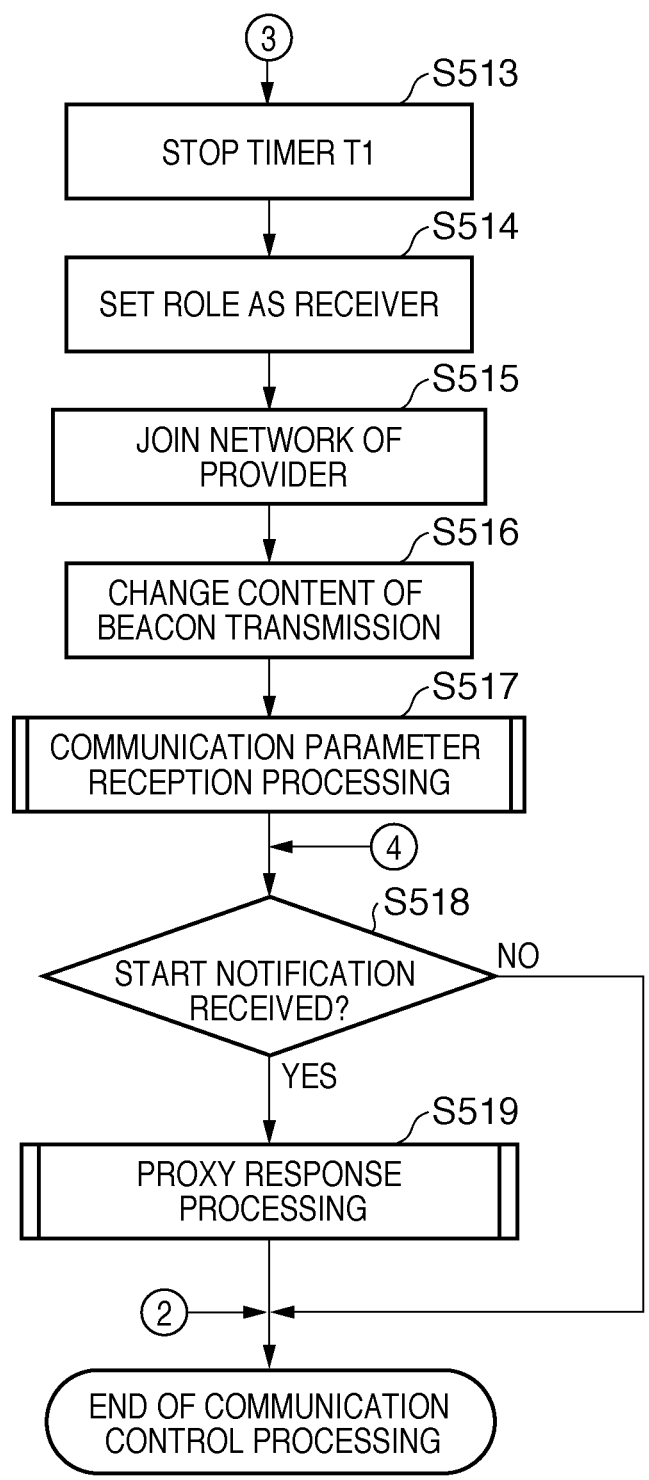

FIGS. 5A to 5C are flowcharts illustrating the procedure of communication control processing in each communication apparatus when performing communication parameter automatic setting processing.

Communication control processing executed by each communication apparatus will be explained below according to the flowchart.

When the setting button 106 is pressed to indicated that communication parameter automatic setting processing should be stated, a communication apparatus recognizes it (step S501).

The communication apparatus in which the setting button 106 has been pressed checks if it already belongs to a network (step S502). For example, a case in which the apparatus belongs to a network indicates a case in which the apparatus has already formed the network using communication parameters shared by executing communication parameter automatic setting processing with another communication apparatus. Processing when the apparatus belongs to a network will be described later with reference to FIG. 7 and the like.

If the apparatus is determined not to belong to any network in step S502, the apparatus creates a network to determine its role (step S503). The apparatus sets its role as a provider candidate (step S504), and starts a timer T1 (step S505).

In step S506, the apparatus starts beacon transmission. Note that a beacon to be transmitted may contain an information element indicating the current role "provider candidate".

The apparatus executes provider search processing until a provider is found or the timer T1 expires (steps S507 to S512).

More specifically, if the timer T1 has not expired (NO in step S507), it is determined whether the apparatus has received a search signal (probe request) from another communication apparatus (step S508). If the apparatus determines that it has received a search signal from another communication apparatus, it transmits a search response signal (probe response) in response to the search signal (step S509).

The apparatus also transmits a search signal (probe request) (step S510), and stands by for reception of a search response signal (probe response) (step S511).

Upon receiving a search response signal (YES in step S511), the apparatus determines whether the role of the other communication apparatus indicated by an information element contained in the received search response signal is a provider (step S512). If the role of the other communication apparatus is determined to be a provider, the apparatus stops the timer T1 (step S513), and sets its role as a receiver (step S514).

Upon being set as a receiver, the communication apparatus joins a network created by the provider (step S515), and transmits a beacon containing an information element indicating that the role of its own is "receiver" (step S516).

At this time, since the provider has not yet provided communication parameters for the apparatus, the apparatus cannot perform communication using encryption and authentication in the network which it has joined. Upon joining the network, the receiver starts communication parameter reception processing (step S517). Details of the communication parameter reception processing will be described later.

Upon completion of the communication parameter reception processing in step S517, communication connection processing can be executed.

After that, it is determined whether the communication apparatus has received a start notification (step S518). If the communication apparatus has received a start notification, it performs proxy response processing (step S519). Details of the processes in steps S518 and S519 will be described later using FIG. 7 and the like together with processes in steps S525 to S532 (processes when the communication apparatus itself belongs to a network).

On the other hand, if it is determined in step S507 that the communication apparatus cannot find a communication apparatus whose role is a provider before the timer T1 expires, the communication apparatus sets its role as a provider (step S520).

The communication apparatus transmits a beacon containing an information element indicating that the role of its own is "provider" (step S521). It is also determined whether the communication apparatus has received a search signal from another communication apparatus (step S522). If the communication apparatus determines that it has received a search signal from another communication apparatus, it transmits a search response signal in response to the search signal (step S523).

Upon being set as a provider, the communication apparatus starts communication parameter providing processing I (step S524). Details of the communication parameter providing processing I (step S524) will be described later.

Upon completion of the communication parameter providing processing I in step S524, the communication apparatus advances the process to step S518.

The method (active scan) of searching for a provider by standing by for reception of a search response signal (probe response) to a search signal (probe request) has been explained in steps S508 to S512. The present invention, however, is not limited to this.

As described above, the provider transmits a beacon added with an information element indicating that communication parameter automatic setting processing is in progress. Therefore, a method (passive scan) in which the receiver stands by for reception of the beacon may be used.

<3.4 Procedure of Communication Parameter Providing Processing I>

Figure 6A:
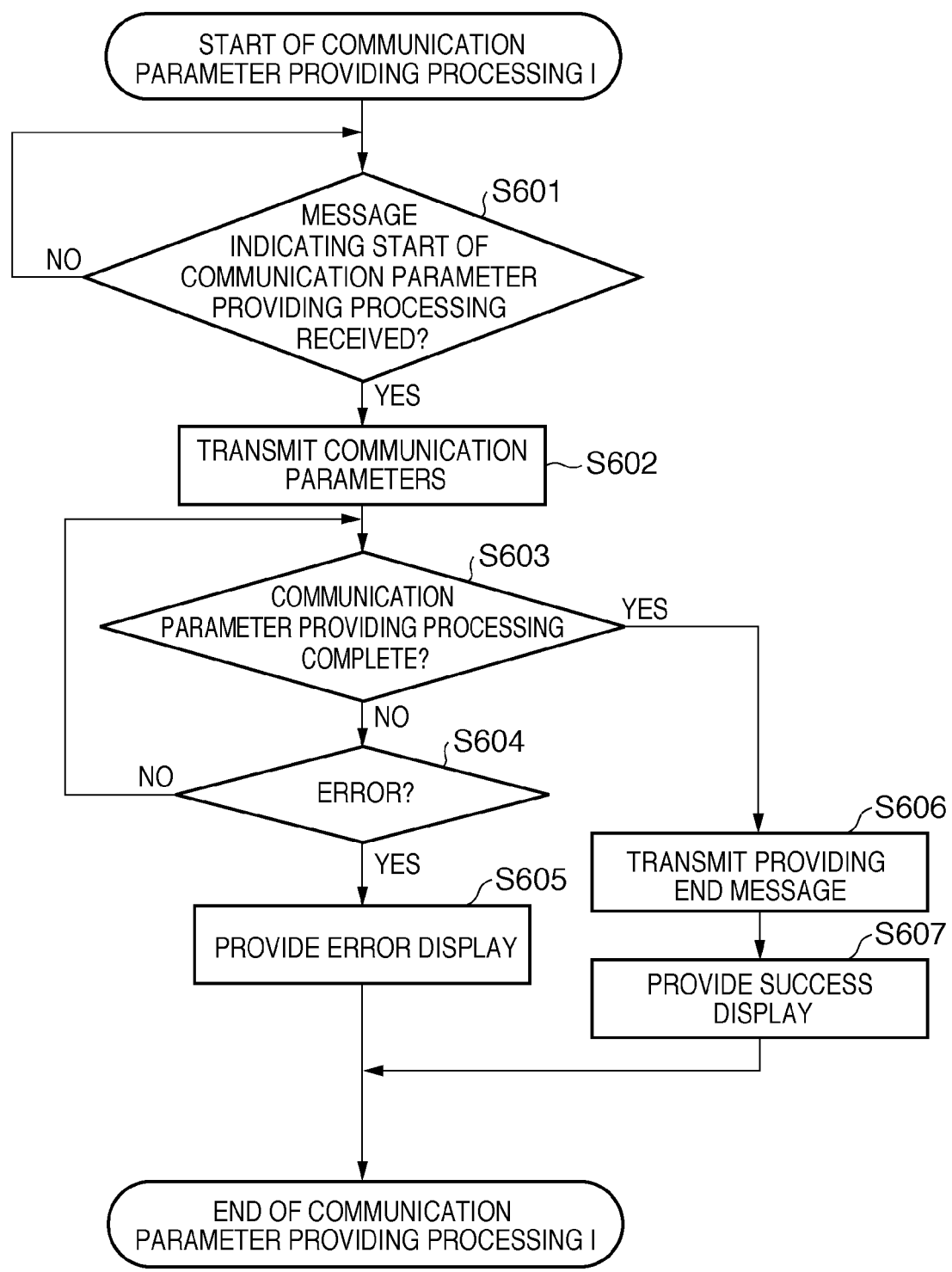
FIG. 6A is a flowchart illustrating details of communication parameter providing processing I (step S524)

Details of the communication parameter providing processing I (step S524) will now be described. FIG. 6A is a flowchart illustrating details of the communication parameter providing processing I (step S524).

Upon receiving a communication parameter providing start message from the receiver (YES in step S601), the provider starts to provide communication parameters (step S602). The communication parameters to be provided in this case are the communication parameters of the network created in step S503.

In step S603, the provider determines whether the communication parameter providing processing is complete. If the provider determines in step S603 that the communication parameter providing processing is complete, the process advances to step S606 to transmit a communication parameter providing end message to the receiver.

In step S607, the provider provides a display to indicate that the communication parameter automatic setting processing has succeeded.

More specifically, the display unit 105 provides a display to indicate to the user that the communication parameter automatic setting processing has succeeded by way of a message on an LCD, flickering, lighting, and color of an LED, or a sound.

On the other hand, if an error occurs in step S604, the process advances to step S605 to provide a display to indicate that the error has occurred in the communication parameter automatic setting processing.

More particularly, the display unit 105 provides a display to indicate to the user that the error has occurred in the communication parameter automatic setting processing by way of a message on the LCD, flickering, lighting, and color of an LED, or a sound.

<3.5 Procedure of Communication Parameter Reception Processing>

Figure 6B:
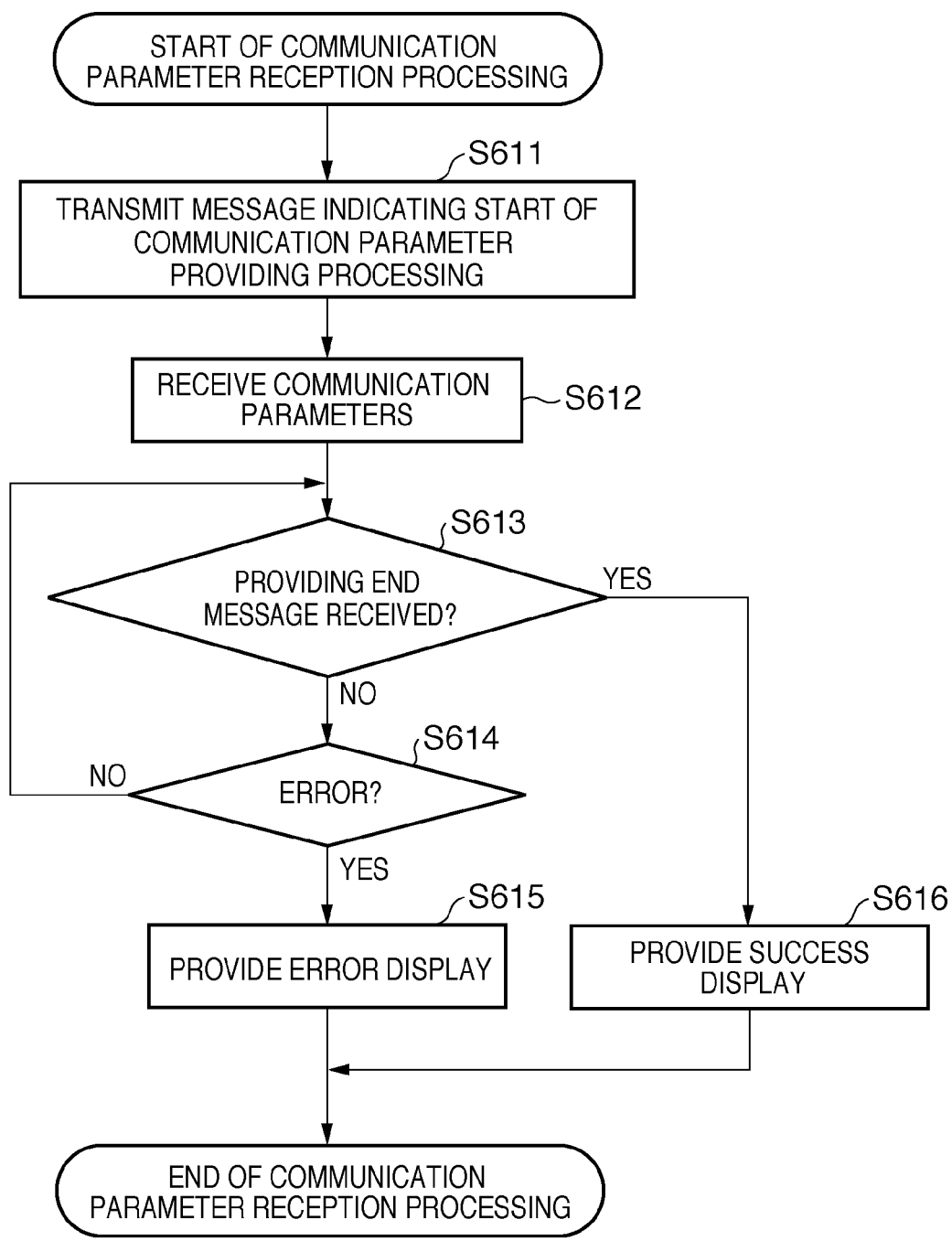
FIG. 6B is a flowchart illustrating details of communication parameter receiving processing (step S517)

Details of the communication parameter reception processing (step S517) will now be described. FIG. 6B is a flowchart showing details of the communication parameter reception processing (step S517).

To request to provide communication parameters, the receiver transmits a communication parameter providing start message to the provider (step S611). Then, the receiver starts processing of receiving the communication parameters from the provider (step S612).

In step S613, the receiver determines whether the communication parameter reception processing is complete. If the receiver determines in step S613 that the communication parameter reception processing is complete, the process advances to step S616 to provide a display to indicate that the communication parameter reception processing has been completed.

More specifically, the display unit 105 provides a display to indicate to the user that the communication parameter reception processing has succeeded by way of a message on the LCD, flickering, lighting, and color of an LED, or a sound.

On the other hand, if an error occurs in step S614, the process advances to step S615 to provide a display to indicate that the error has occurred in the communication parameter reception processing.

More particularly, the display unit 105 provides a display to indicate to the user that the error has occurred in the communication parameter reception processing by way of a message on the LCD, flickering, lighting, and color of an LED, or a sound.

4. Communication Parameter Automatic Setting Processing Example 2

Communication parameter automatic setting processing when a communication apparatus newly joins an already built ad hoc network will be explained next. The already built ad hoc network indicates an ad hoc network which has been formed from a plurality of communication apparatuses using communication parameters shared between communication apparatuses which had executed communication parameter automatic setting processing.

<4.1 Network Configuration>

Figure 7:
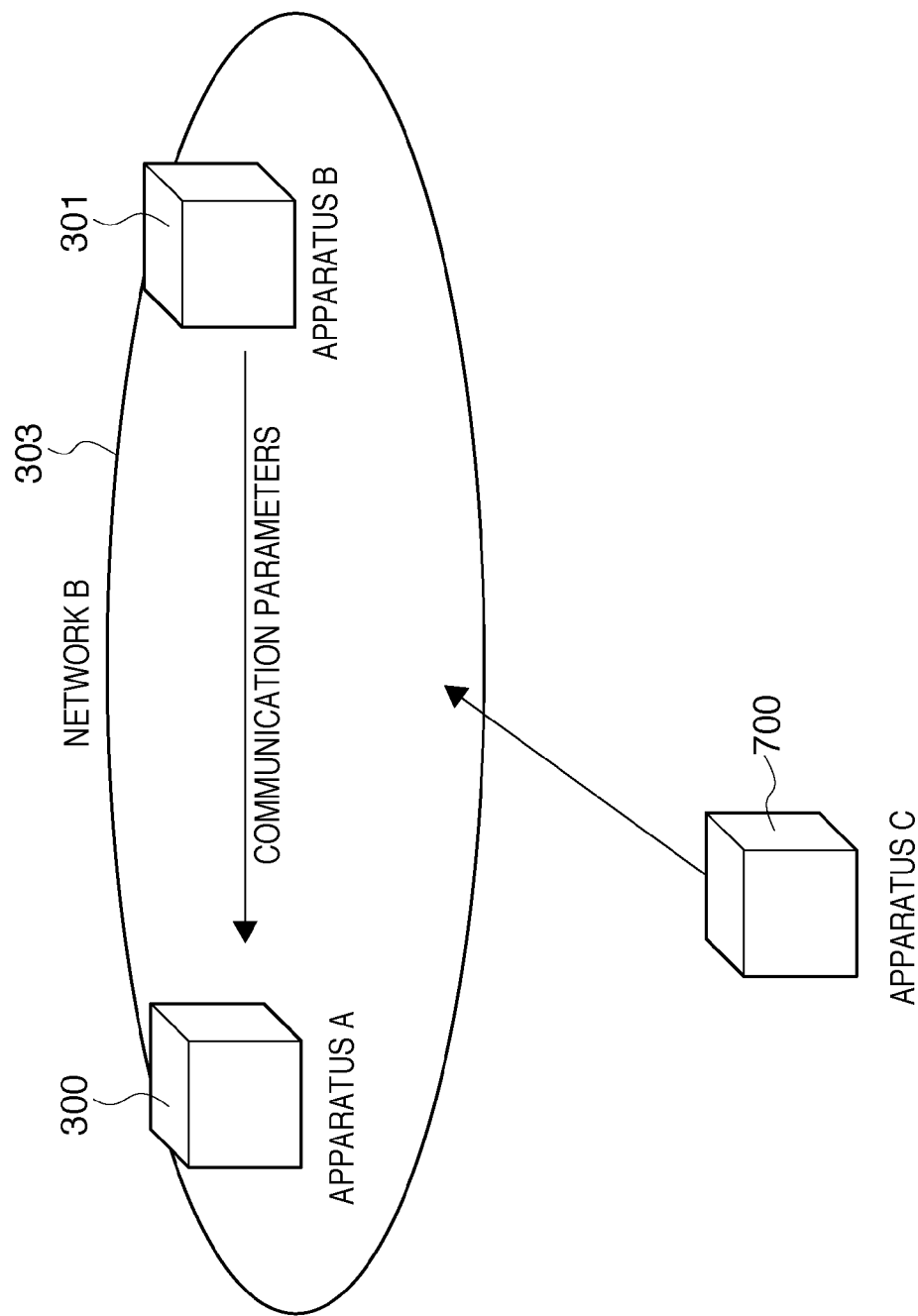
FIG. 7 is a view showing apparatuses A, B, and C, and network B.

FIG. 7 is a view showing the second communication apparatus A 300 (to be referred to as apparatus A hereinafter), the first communication apparatus B 301 (to be referred to as apparatus B hereinafter), a third communication apparatus C 700 (to be referred to as apparatus C hereinafter), and network B. Note that apparatuses A, B, and C have the hardware arrangement of FIG. 1 and the functional configuration of FIG. 2 which have been described above.

Assume that the setting buttons 106 of apparatuses B and C are pressed, and apparatus C then joins network B formed from apparatuses A and B. Parameter automatic setting processing in this case will be explained below.

<4.2 Processing Sequence of Communication Parameter Automatic Setting Processing>

Figure 8:
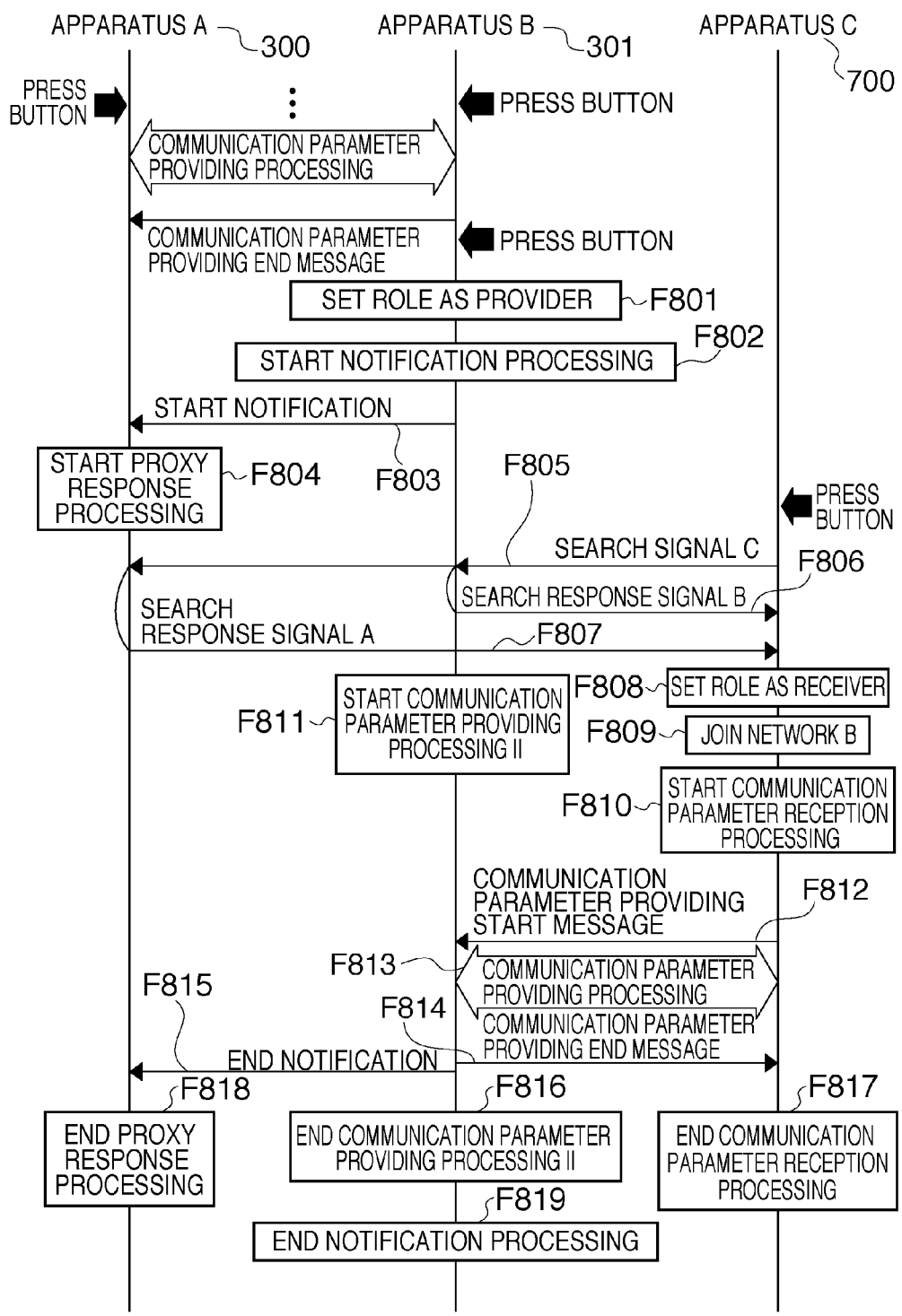
FIG. 8 is a sequence chart showing an example of the processing sequence of communication parameter automatic setting processing executed by pressing setting buttons 106 of apparatuses B and C when network B is formed from apparatuses A and B.

FIG. 8 is a sequence chart showing an example of the processing sequence of communication parameter automatic setting processing executed by pressing the setting buttons 106 of apparatuses B and C when network B is formed from apparatuses A and B.

At this time, apparatus A has received communication parameters from apparatus B by executing communication parameter automatic setting processing, and already belongs to network B in which communication is performed using the communication parameters (F421 and F422). Apparatus C does not receive communication parameters yet.

Apparatus B has already joined network B using the communication parameters which had been shared with apparatus A by executing the communication parameter automatic setting processing. If the user presses the setting button 106 of apparatus B, apparatus B sets its role as a provider (F801).

Subsequently, apparatus B starts notification processing (F802). After the notification processing starts, apparatus B transmits a start notification message (F803), and increases the beacon transmission frequency (the beacon transmission rate or the number of times of beacon transmission) per unit time.

Upon receiving the start notification message (F803), apparatus A starts proxy response processing (F804), and decreases the beacon transmission frequency.

When apparatus B increases the beacon transmission frequency and apparatus A decreases the beacon transmission frequency as described above, apparatus C newly joining the network can detect apparatus B serving as a provider within a shorter time.

When the user presses the setting button 106 of apparatus C, apparatus C creates unique network C, sets its role as "provider candidate", starts a timer T1, and then starts beacon transmission. Note that these processes are omitted in FIG. 8.

Furthermore, apparatus C transmits search signal C to detect a provider (F805). In response to search signal C (F805) transmitted from apparatus C, apparatuses A and B in network B return search response signals A and B, respectively (F806 and F807). Upon returning search response signal B (F806), apparatus B starts communication parameter providing processing II (F811).

Assume that apparatus A returns search response signal A (F807) containing identification information (an MAC address) of apparatus B serving as a provider.

Assume also that apparatus B returns search response signal B (F806) containing an information element indicating that apparatus B itself is a provider. This allows apparatus C to reliably detect apparatus B serving as a provider regardless of which communication apparatus in network B returns a search response signal itself.

Upon detecting the presence of the provider, apparatus C sets its role as a receiver (F808). Apparatus C then joins network B (F809), and starts processing of receiving communication parameters needed for communication in network B from apparatus B serving as a provider (F810).

Apparatus C transmits a communication parameter providing start message (F812). Apparatus B serving as a provider executes communication parameter providing processing for apparatus C serving as a receiver (F813). When the communication parameter providing processing is complete, apparatus B transmits a communication parameter providing end message to apparatus C (F814). Apparatus B also transmits an end notification message to apparatus A (F815).

Then, the communication parameter providing processing II and the communication parameter reception processing are completed (F816 and F817). Apparatus C and apparatus B (and apparatus A) thus share the communication parameters.

Apparatus B returns the increased beacon transmission frequency, and ends the notification processing (F819).

Upon receiving the end notification message from apparatus B, apparatus A returns the decreased beacon transmission frequency, and ends the proxy response processing (F818).

In this manner, the user can cause apparatus C to automatically join network B only by operating the setting button 106.

A case in which the setting button 106 of apparatus B is operated has been described with reference to FIG. 8. However, the setting button 106 of apparatus A may be operated. When the setting button 106 of apparatus A is operated, apparatus A becomes a provider, and apparatus C can join network A in the same manner as in FIG. 8.

<4.3 Procedure of Communication Control Processing in Communication Apparatus>

Assume that when network B is formed from apparatuses A and B, communication parameter automatic setting processing is executed by pressing the setting buttons 106 of apparatuses B and C. Communication control processing in each communication apparatus in this case will be described with reference to FIGS. 5A to 5C.

First, communication control processing in apparatus B will be explained. When the setting button of apparatus B is pressed, apparatus B recognizes it (step S501).

When the setting button 106 is pressed, apparatus B determines that it currently belongs to a network (YES in step S502), and sets its role as a provider (step S525). Then, apparatus B transmits a beacon containing an information element indicating that the role is "provider" and that indicating that automatic setting processing is in progress (step S526).

Subsequently, apparatus B starts notification processing. More specifically, in step S527, apparatus B increases the beacon transmission frequency (the transmission rate or the number of times of transmission) per unit time (the first change step).

In an IEEE802.11 wireless LAN ad hoc network, it is defined that a communication apparatus which is to return a search response signal (probe response) is the one that has transmitted a beacon immediately before receiving a search signal (probe request).

In step S527, therefore, CW is set to a value smaller than an initial value. This increases the number of times of beacon transmission per unit time by a provider (apparatus B in this case) as compared with another communication apparatus (apparatus A in this case) belonging to the network.

Consequently, in provider search processing (steps S510 to S512 in FIG. 5B) by apparatus C newly joining the network, it is possible to detect a search response signal (probe response) from the provider within a short time.

As described above, as the beacon transmission frequency of the provider increases, the probability of reception of a search response signal (probe response) from the provider increases when apparatus C newly joining the network searches for a provider becomes high. Even when apparatus C newly joining the network searches for a provider by the passive scan, the probability of reception of a beacon from the provider rises.

This makes it possible to lower the probability that apparatus C newly joining the network cannot detect the provider and then an elapsed time exceeds the time limit of communication parameter providing processing. If apparatus C newly joining the network can detect the provider within a short time, it is possible to shorten a time elapsed until the communication parameter providing processing ends.

Referring back to FIGS. 5A to 5C, in step S528, apparatus B broadcasts a start notification message to notify that the communication parameter providing processing has started. Note that apparatus B may unicast the start notification message to each communication apparatus which belongs to the network. In other words, the start notification message is a message to notify that apparatus B has started an operation as a provider.

In step S529, whether apparatus B has received a search signal from apparatus C which is to newly join the network is determined. If it is determined that apparatus B has received a search signal, apparatus B transmits a search response signal to apparatus C in response to the search signal (step S530).

Upon being determined to be a provider, a communication apparatus starts communication parameter providing processing II (step S531). Details of the communication parameter providing processing II (step S531) will be described later.

Upon completion of the communication parameter providing processing II in step S531, apparatus B resets CW to the initial value (step S532), thereby returning the beacon transmission frequency increased in step S527. The notification processing then ends.

As long as the communication parameter providing processing II has started, CW may be reset to the initial value immediately after the processing starts, after the processing ends, or after an error occurs.

If CW is reset immediately after the processing starts, the beacon transmission frequency (the number of times of beacon transmission) decreases, thereby more efficiently reducing the power consumption by beacon transmission. The start notification message transmitted in step S528 is repeatedly transmitted until the communication parameter providing processing II abnormally ends or the processing of providing communication parameters for the receiver is completed.

Communication control processing in apparatus C will now be explained. When the setting button of apparatus C is pressed, apparatus C recognizes it (step S501).

When the setting button 106 of apparatus C is pressed, apparatus C determines that it does not belong to any network (NO in step S502), and sets its role as a provider candidate (step S504). Then, apparatus C starts the timer T1 (S505). In step S506, apparatus C starts beacon transmission.

If the timer T1 has not expired (NO in step S507), apparatus C transmits a search signal (step S510), and stands by for reception of a search response signal (step S511). Upon determining that the role of another communication apparatus (apparatus B) indicated by an information element contained in the search response signal is a provider, apparatus C stops the timer T1 (step S513), and sets its role as a receiver (step S514).

Apparatus C then joins the network created by apparatus B serving as a provider (step S515), and transmits a beacon containing an information element indicating that the role of its own is "receiver" (step S516). Upon joining the network, apparatus C starts communication parameter reception processing (step S517). Details of the communication parameter reception processing have been explained, and a description thereof will be omitted here.

Communication control processing in apparatus A will be described next. In apparatus A, communication parameter automatic setting processing has been executed with apparatus B, and communication parameter reception processing (step S517) has been completed.

In step S518, apparatus A determines whether it has received the start notification message from apparatus B. Upon receiving the start notification message, apparatus A executes proxy response processing (step S519). The detailed procedure of the proxy response processing (step S519) will be described later.

It is possible to readily share communication parameters between communication apparatuses by executing the above communication control processing.

As described above, when only the setting buttons 106 of apparatuses B and C are operated, communication connection processing is performed between apparatuses B and C, thereby forming network B.

As described above, the communication connection processing may automatically start after the communication parameter providing processing is completed, or may start when the setting button 106 is pressed again or when the input unit 109 issues a connection command. The communication connection processing varies depending on an authentication method and an encryption method indicated by shared communication parameters.

<4.4 Procedure of Communication Parameter Providing Processing II>

Figure 9A:
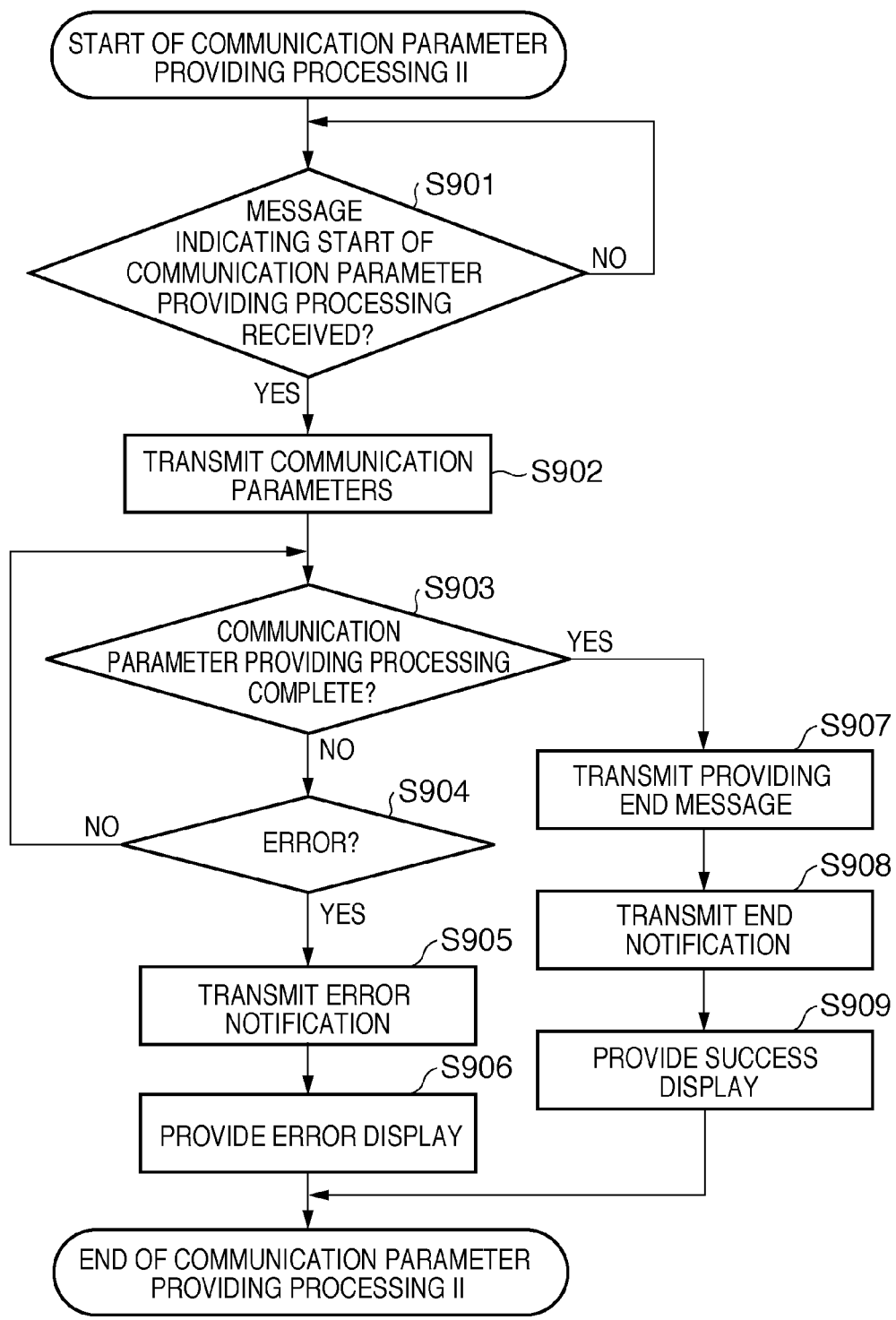
FIG. 9A is a flowchart illustrating details of communication parameter providing processing II (step S531)

Details of the communication parameter providing processing II (step S531) will now be explained. FIG. 9A is a flowchart illustrating details of the communication parameter providing processing II (step S531).

Upon receiving a communication parameter providing start message from the receiver (YES in step S901), the provider starts to provide communication parameters (step S902). The communication parameters to be provided at this time are the communication parameters of the network created in step S503.

In step S903, whether the communication parameter providing processing is complete is determined. If the provider determines in step S903 that the communication parameter providing processing is complete, the process advances to step S907 to transmit a communication parameter providing end message to the receiver.

In step S908, the provider broadcasts an end notification message indicating the end of the communication parameter providing processing for the receiver. Note that the provider may unicast the end notification message to a communication apparatus (apparatus A in this case) belonging to the network.

In step S909, the provider provides a display to indicate that the communication parameter automatic setting processing has succeeded.

More particularly, the display unit 105 provides a display to indicate to the user that the communication parameter automatic setting processing has succeeded by way of a message on the LCD, flickering, lighting, and color of the LED, or a sound.

On the other hand, if an error is determined in step S904, the process advances to step S905 to broadcast an error notification message. Note that the provider may unicast the error notification message to a communication apparatus (apparatus A in this case) belonging to the network.

In step S906, the provider provides a display to indicate that an error has occurred in the communication parameter automatic setting processing.

More particularly, the display unit 105 provides a display to indicate to the user that the error has occurred in the communication parameter automatic setting processing by way of a message on the LCD, flickering, lighting, and color of the LED, or a sound.

<4.5 Procedure of Proxy Response Processing>

Figure 9B:
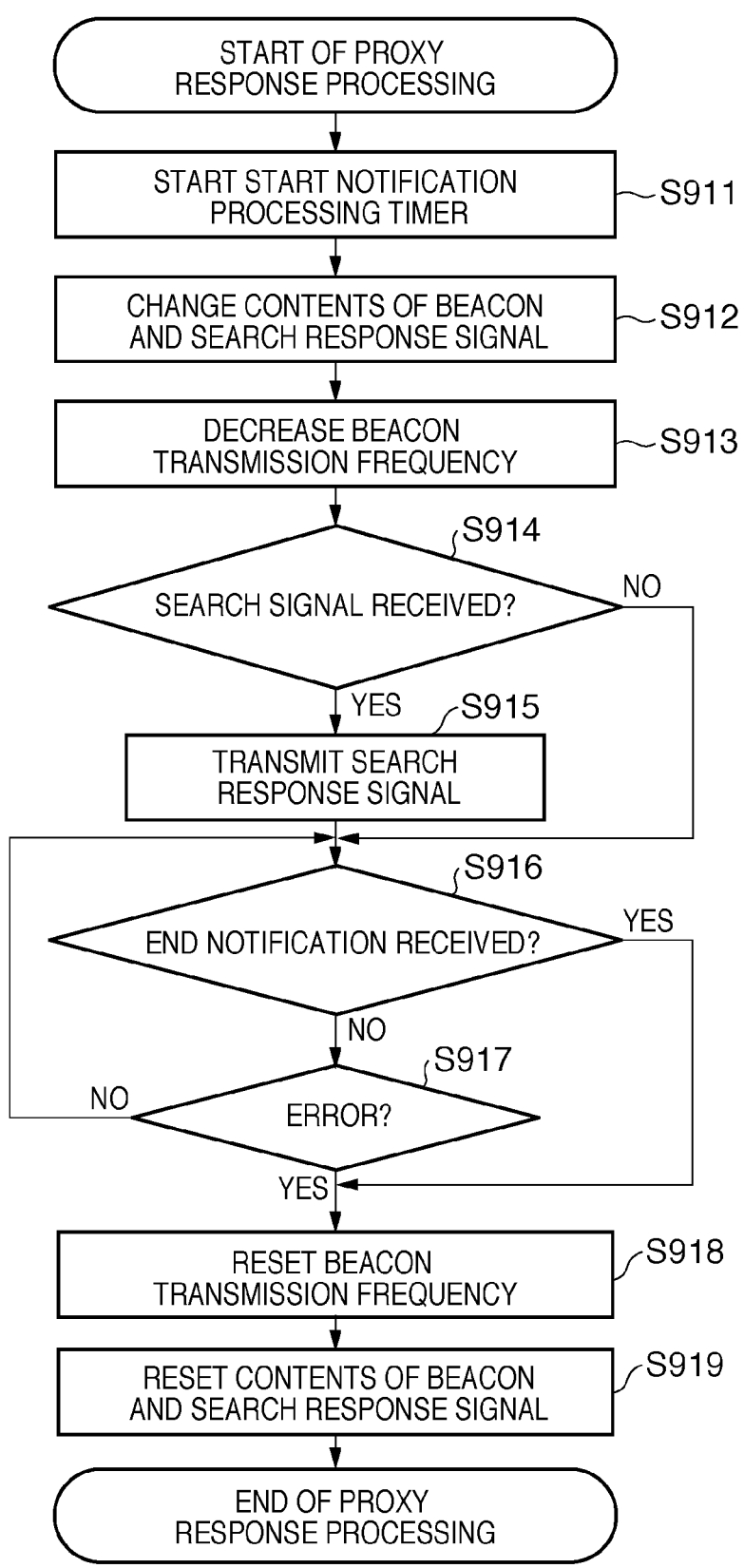
FIG. 9B is a flowchart illustrating details of proxy response processing (step S519)

Details of the proxy response processing (step S519) will be explained. FIG. 9B is a flowchart illustrating details of the proxy response processing (step S519).

Upon receiving the start notification message (YES in step S518), apparatus A starts the proxy response processing of FIG. 9B.

Upon detecting reception of the start notification message, the automatic setting control unit 208 of apparatus A starts a timer to determine whether an elapsed time exceeds the time limit of processes to be executed in steps S912 to S919 (step S911).

The automatic setting control unit 208 changes the content of an information element contained in a beacon and search response signal (probe response) to be transmitted (step S912).

More specifically, the automatic setting control unit 208 adds identification information for uniquely identifying the provider (apparatus B) to the beacon and search response signal (probe response) to be transmitted. The unit 208 stores, for example, the MAC address information of the provider as the identification information. This allows the communication apparatus (apparatus C) as a transmission source of a search signal to detect the presence of the provider even when apparatus A not serving as the provider returns the search response signal in response to the search signal.

In step S913, the beacon control unit 213 changes CW to a value larger than the initial value and sets it, thereby decreasing the beacon transmission frequency (transmission rate) (the second change step).

As compared with the provider (apparatus B), this reduces the number of times of beacon transmission per unit time by each of the communication apparatuses (apparatus A) which belong to the network except for the provider. As a result, in provider search processing (steps S509 to S512 in FIG. 5B) executed by a communication apparatus (apparatus C) newly joining the network, it is possible to detect a search response signal (probe response) within a short time.

After that, apparatus A stands by for an end notification message or error notification message transmitted by the provider (apparatus B) (steps S916 and S917).

Upon receiving a notification message, the beacon control unit 213 of apparatus A resets CW to the initial value, and returns the beacon transmission frequency decreased in step S913 (step S918).

Furthermore, the automatic setting control unit 208 returns the content of the information element contained in the beacon and search response signal to be transmitted to that before change in step S912 (step S919). That is, the unit 208 deletes, from the beacon and search response signal, the identification information for uniquely identifying the provider (apparatus B) added to the beacon and search response signal to be transmitted.

If the timer set in step S911 has expired, the receiver (apparatus A) aborts the processes in steps S912 to S919. Note that if the processes in steps S912 and S913 have already executed at the time of the expiration of the timer, resetting processes like in steps S918 and S919 are performed.

5. Authentication Methods and Encryption Methods

Authentication methods and encryption methods will be described next. In this embodiment, combinations of authentication methods and encryption methods to be adopted are as shown in, for example, FIG. 10.

Open authentication is an authentication method defined as Open System Authentication in the IEEE802.11 standard. See the IEEE802.11 standard for details of the method. Shared authentication is an authentication method defined as Shared Key Authentication in the IEEE802.11 and IEEE802.11i standards, and uses WEP as an encryption method.

WEP is an abbreviation for Wired Equivalent Privacy. See the IEEE802.11 or IEEE802.11i standard for details of WEP. A WPA authentication method, a WPA-PSK authentication method, WPA2 authentication method, and WPA2-PSK authentication method are standards for an encryption method defined by the Wi-Fi alliance. These methods are based on RSNA (Robust Security Network Association) in the IEEE802.11i standard.

TKIP is an abbreviation for Temporal Key Integrity Protocol. CCMP is an abbreviation for CTR with CBC-MAC Protocol, and uses AES as an encryption method. AES is an abbreviation for Advanced Encryption Standard.

See Wi-Fi alliance specifications and test specifications for details of TKIP, COMP, and AES. The WPA-PSK and WPA2-PSK authentication methods use a pre-shared key. The WPA and WPA2 authentication methods perform user authentication using an additionally provided authentication server, and acquire an encryption key of a communication path from the authentication server. See the IEEE802.11i standard for details of these methods.

A communication connection processing method varies depending on the authentication method. Currently available authentication methods include six kinds of authentication, that is, the open authentication, shared authentication, WPA authentication, WPA-PSK authentication, WPA2 authentication, and WPA2-PSK authentication, as shown in a table. Out of them, the WPA and WAP2 authentication methods are substantially identical. Furthermore, the WPA-PSK and WPA2-PSK authentication methods are substantially identical. Therefore, four authentication methods (open, shared, WPA, and WPA-PSK authentication methods) will be explained below.

In the WPA authentication, an additional authentication server is externally provided, and authentication processing is performed using the authentication server. Therefore, when all communication apparatuses equally operate like in this embodiment, the authentication processing becomes cumbersome, and a description thereof will be omitted.

In this embodiment, the open authentication, shared authentication, and WPA-PSK authentication will be explained.

6. Details of Authentication Methods (1) Open Authentication

First, the open authentication will be described. In the open authentication, communication apparatuses set communication parameters shared between them by executing communication parameter automatic setting processing, and search for one another to form an IBSS network.

(2) Shared Authentication

Next, the shared authentication will be explained. Details of the shared authentication are described in the IEEE802.11 and IEEE802.11i specifications, and will not be described in detail. When the shared authentication is performed, a requester and responder must be determined.

In the infrastructure mode, an STA (station) operates as a requester, and an AP (access point) operates as a responder. On the other hand, in the ad hoc mode, no AP exists. To implement the shared key authentication in IBSS, an STA needs to have a responder function and a requester/responder role determination algorithm.

The requester/responder role determination algorithm may adopt the same method as that for a supplicant/authenticator role determination algorithm in the WPA-PSK authentication (to be described later). For example, a communication parameter provider in communication parameter automatic setting processing may become a responder, and a communication parameter receiver may become a requester.

(3) WPA-PSK Authentication

Figure 12:
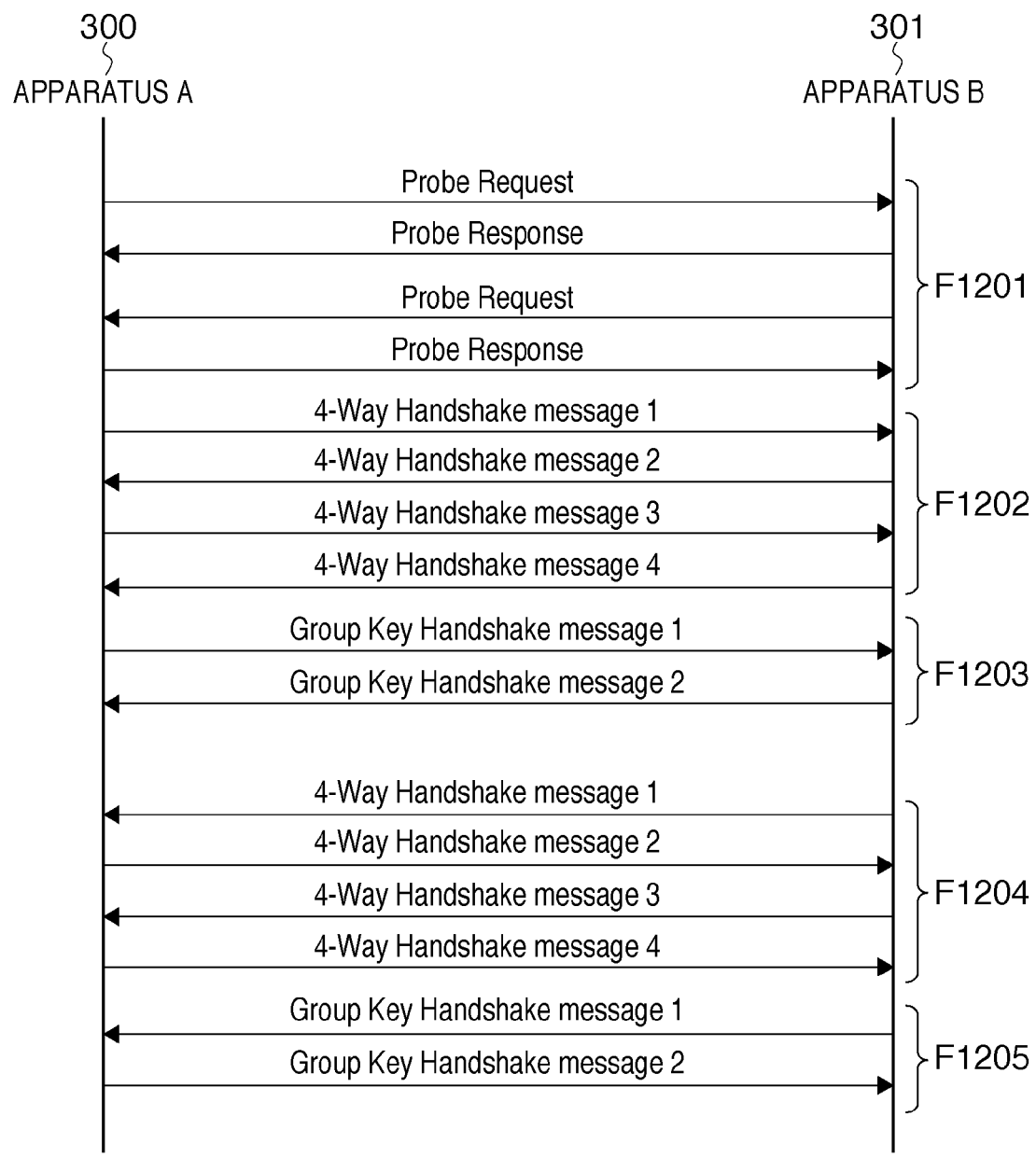
FIG. 12 is a sequence chart of key exchange processing (example 1)

Lastly, the WPA-PSK authentication will be described. The WPA-PSK authentication has been standardized in the IEEE802.11i standard and WPA, and the operation method in IBSS has been defined. FIG. 12 shows the sequence defined in the IEEE802.11i standard. See the IEEE802.11i standard for details of this sequence. An outline will be explained here.

Assume that there exist apparatuses A and B which have completed communication parameter automatic setting processing. Upon completion of the communication parameter automatic setting processing, communication connection processing is automatically executed or is executed in response to a user operation, by using automatically set communication parameters.

Apparatuses A and B search for one another (F1201). When apparatuses A and B recognize each other, an apparatus, out of apparatuses A and B, having a larger MAC address becomes an authenticator, and the other apparatus becomes a supplicant. Apparatuses A and B then execute the four-way handshake and group key handshake for the first time (F1202 and F1203).

The four-way handshake is a mechanism for exchanging random numbers between the authenticator and the supplicant, and generating, for each session, an encryption key for a unicast packet called a pairwise key based on a pre-shared key. The group key handshake is a mechanism for sending an encryption key for a multicast packet or broadcast packet held in the authenticator.

After that, the roles of the authenticator and supplicant are swapped, and the four-way handshake and the group key handshake are performed again (F1204 and F1205). This allows encrypted communication between apparatuses A and B.

7. Method for Improving Processing Time

As described above, in the method completely complying with the IEEE802.11i specifications, processing becomes redundant because the four-way handshake and group key handshake are executed several times. It takes long time to complete connection due to execution of the redundant processing and the role determination algorithm. It is, therefore, possible to adopt a method for reducing the redundant processing and improving the processing time.

Some methods can be considered. In this embodiment, the following four methods will be explained.

First method: The number of times of execution of the four-way handshake is reduced to one.

Second method: Group keys are integrated into one group key in a network.

Third method: Group keys and pairwise keys are integrated into one key.

Fourth method: Key exchange is executed in communication parameter automatic setting processing.

FIG. 11 shows differences in number of key exchange sequences, number of held pairwise keys, and number of held group keys between the above four methods.

The number of held keys will be explained. In an ad hoc IBSS network including n communication apparatuses, in the case of the method completely complying with the IEEE802.11i standard, the number of pairwise keys needs to be n−1 corresponding to the number of opposing communication apparatuses. The number of group keys needs to be n+1 in total because it is necessary to hold the number of group keys corresponding to that of the opposing communication apparatuses, a key for the current group itself, and a key for the immediately preceding group. The reason why the two group keys are necessary is because there exists a communication apparatus which has different group keys in transition in the same network depending on the progress of the group key handshake.

In the first method, only the number of sequences is decreased, and the number of held keys remains the same.

In the second method, n−1 pairwise keys are necessary like the above method but only one group key is required for the network.

In the third method, a group key is directly used as a pairwise key. The number of pairwise keys, therefore, becomes zero and only one group key is held.

In the fourth method, n−1 pairwise keys are necessary like the above method. Each communication apparatus in the network may have a group key, or one group key may be held in the entire network. The network, therefore, may have n+1 group keys or only one group key.

The number of times of execution of key exchange for each opposing apparatus will now be described. In the case of the method completely complying with the IEEE802.11i standard, the four-way handshake and the group key handshake are respectively executed twice as already explained with reference to FIG. 12.

In the first method, the redundant four-way handshake is reduced, and the number of times of execution of the four-way handshake then becomes one. The group key handshake is performed twice as the above method.

In the second method, the group keys are integrated into one group key in the network. It is, therefore, necessary to always distribute the group key to a new terminal, and the group key handshake is executed only once. As for the number of times of execution of the four-way handshake, the four-way handshake may be executed once according to the first method, or may be bilaterally executed twice in conformity with the IEEE802.11i standard.

In the third method, since a preset single key is used as a pairwise key and a group key, no key exchange sequence is performed.

In the fourth method, since key exchange processing is performed in the communication parameter automatic setting processing sequence of WPS, the individual four-way handshake is not executed. The group key handshake is executed any number of times.

As described above with reference to FIG. 11, these methods have the advantage in the number of key exchange sequences and that of held keys as compared with the method completely complying with the IEEE802.11i specifications.

Furthermore, the above-described four methods will be explained in detail with reference to sequence charts.

<7.1 Each Method>

(1) First Method

Figure 13:
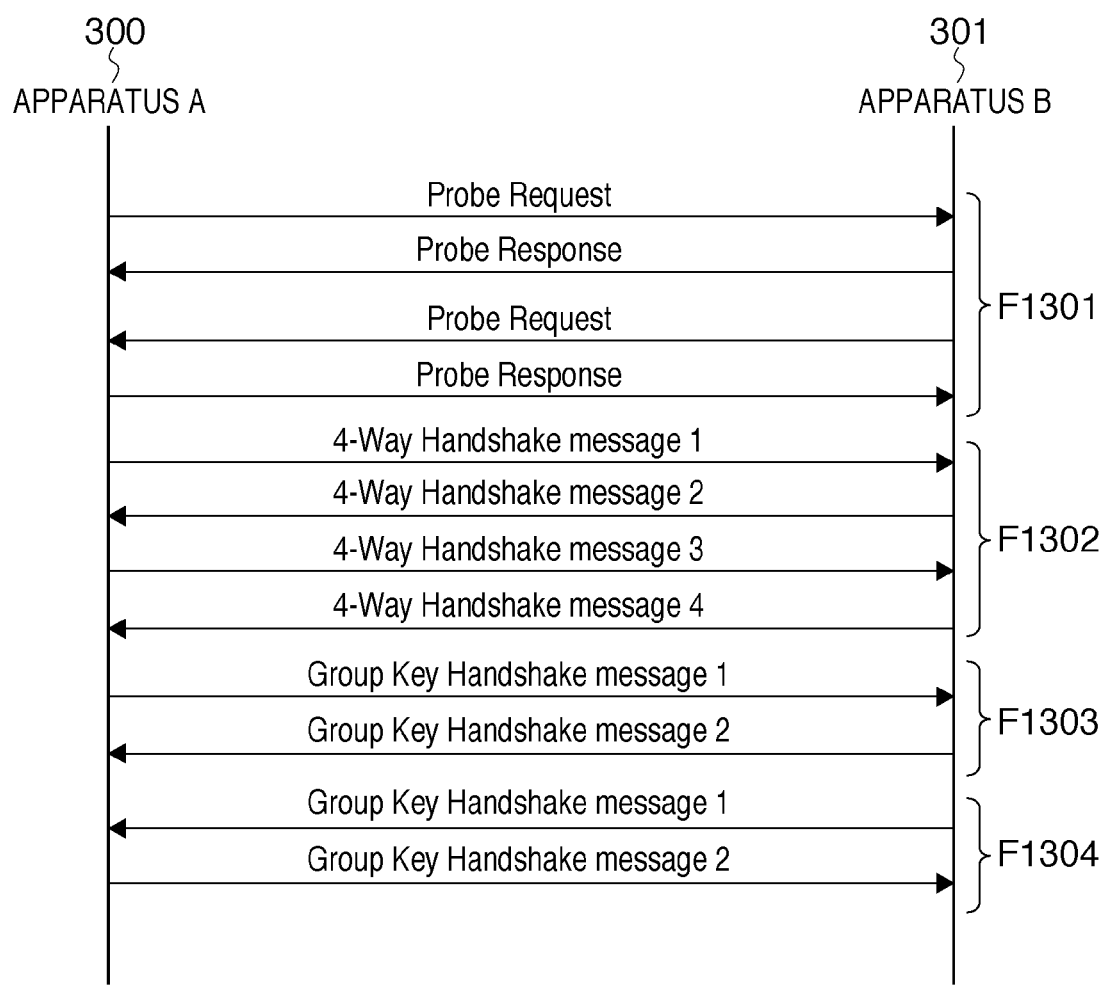
FIG. 13 is a sequence chart of key exchange processing (example 2)

The first method will be described with reference to FIG. 13.

Assume that there exist apparatuses A and B which have completed communication parameter automatic setting processing. Upon completion of the communication parameter automatic setting processing, communication connection processing is automatically executed or is executed in response to a user operation, by using automatically set communication parameters.

Apparatuses A and B search for one another (F1301). When apparatuses A and B recognize each other, an apparatus, out of apparatuses A and B, having a larger MAC address becomes an authenticator, and the other apparatus becomes a supplicant. Apparatuses A and B then execute the four-way handshake (F1302), and also execute the group key handshake for the first time (F1303).

After that, the roles of the authenticator and supplicant are swapped, and the group key handshake is performed again (F1304), thereby allowing communication.

According to the IEEE802.11i specifications, the four-way handshake is executed twice for a pair of communication apparatuses. As described above, however, the first method reduces the number of times of execution of the four-way handshake to one.

The four-way handshake is processing for sharing a pairwise key between communication apparatuses which are executing the four-way handshake. Therefore, successively executing the four-way handshake twice does not increase the security level, and is just redundant. The first method, therefore, can shorten a time taken to execute ordinary communication connection processing by decreasing, to one, the number of times of execution of the four-way handshake which is conventionally executed twice in two ways.

(2) Second Method

Figure 14:
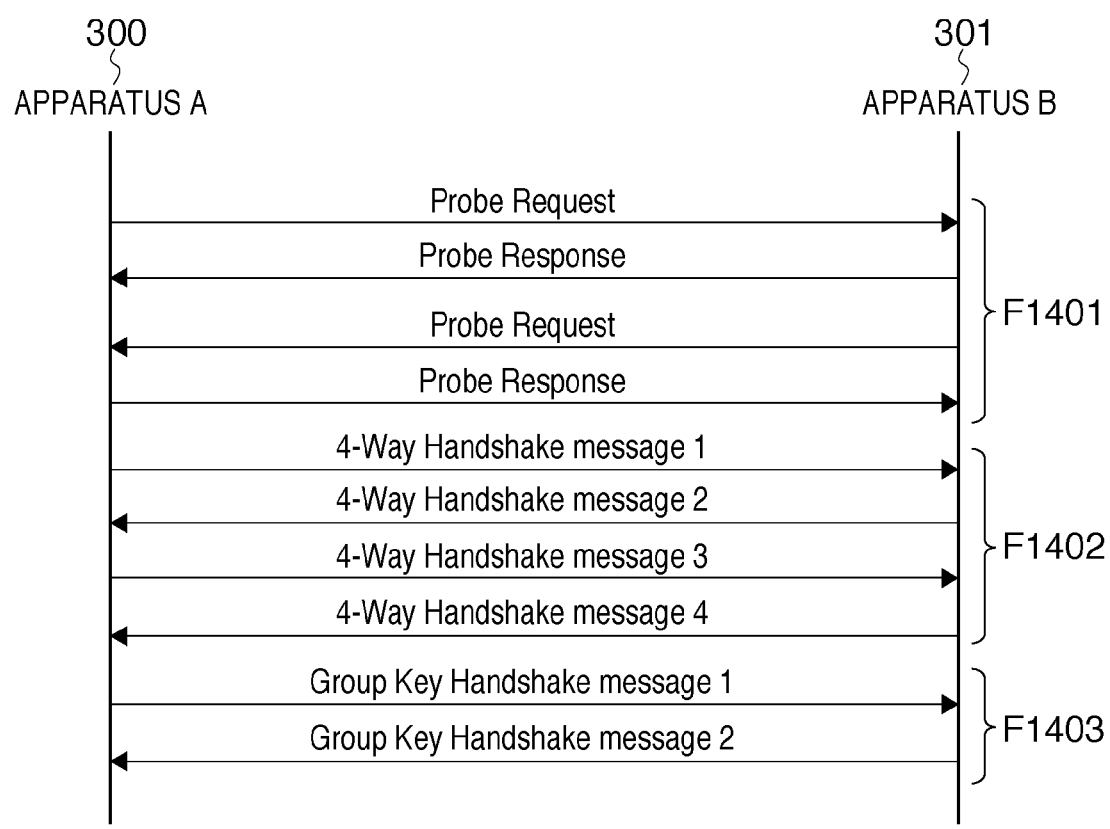
FIG. 14 is a sequence chart of key exchange processing (example 3)

The second method will be described with reference to FIG. 14. Assume that there exist apparatuses A and B which have completed communication parameter automatic setting processing. Upon completion of the communication parameter automatic setting processing, communication connection processing is automatically executed or is executed in response to a user operation, by using automatically set communication parameters.

Apparatuses A and B search for one another (F1401). When apparatuses A and B can recognize each other, an apparatus, out of apparatuses A and B, having a larger MAC address becomes an authenticator, and the other apparatus becomes a supplicant. Apparatuses A and B then execute the four-way handshake and the group key handshake (F1402 and F1403), thereby allowing communication.

According to the IEEE802.11i specifications, a different group key is set in each communication apparatus. In the second method, however, the group keys are integrated into one group key in the network.

A pairwise key is prepared for each communication path and one common group key is used in the network. This can decrease, to one, the number of times of execution of the group key handshake which must be executed twice in accordance with the IEEE802.11i standard. Setting only one group key eliminates the need to hold a different key for each communication apparatus to execute encryption/decryption processing of a broadcast packet and a multicast packet, thereby achieving simplification.

(3) Third Method

The third method is the same as WPA-None (Optional IBSS Global Pre-shared Key System) described in reference 2.

Details of WPA-None are described in above-explained reference 2 and a description thereof will be omitted. In ordinary WPA, the four-way handshake uses a random number to manipulate an element of a pairwise key, thereby generating a session key. On the other hand, in WPA-None, an element of a pairwise key is directly used as a session key.

That is, an important feature of the third method is that no key exchange processing is performed. The security level of this method lowers as compared with ordinary WPA connection processing in which a session key is generated for each connection. This method, however, can raise the security level by activating communication parameter automatic setting processing for each connection, and generating a random communication key for communication parameters shared by the processing every time.

(4) Fourth Method

Figure 15:
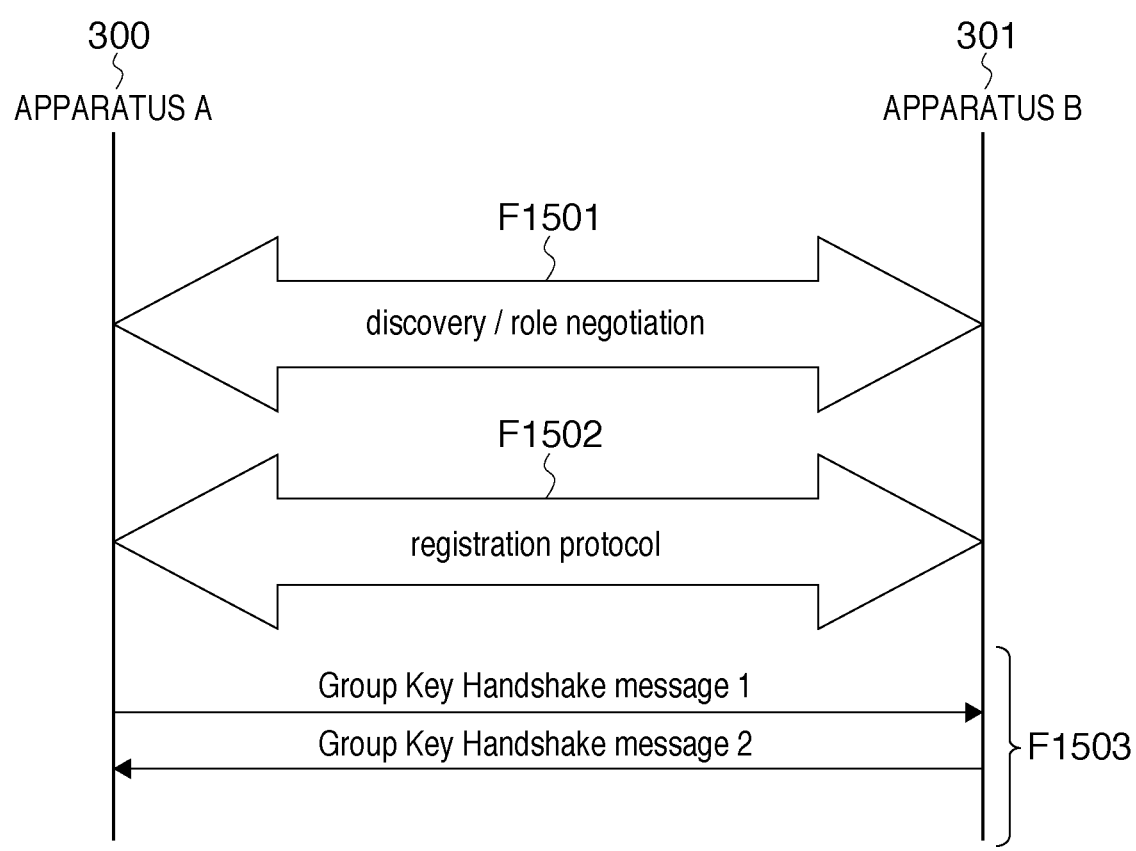
FIG. 15 is a sequence chart of key exchange processing (example 4)

The fourth method will be explained with reference to FIG. 15. First, as described above with reference to FIG. 4, in communication parameter automatic setting processing, communication apparatuses search for one another and their roles are determined (F1501). Subsequently, in the communication parameter automatic setting processing, a communication parameter provider transfers communication parameters to a communication parameter receiver (F1502). In this process F1502, key exchange processing which is not conventionally performed is executed simultaneously with the communication parameter providing processing.

To execute the processes at the same time, for example, a random number used for message exchange processing in the communication parameter providing processing is utilized as a random number for the key exchange processing. At the end of the process F1502, apparatuses A and B share a pairwise key. Upon completion of the communication parameter automatic setting processing, apparatuses A and B execute group key exchange processing (F1503). As described above, the feature of the fourth method is that the key exchange processing is also executed in the communication parameter automatic setting processing.

According to the fourth method, the security level improves since pairwise keys between apparatuses are different from each other even in the same network. Furthermore, it is possible to shorten a total connection time by executing processing corresponding to the four-way handshake in the communication parameter automatic setting processing.

In this explanation, the group key exchange processing is individually executed. However, it is possible to further shorten the total connection time by executing the group key exchange processing in the communication parameter automatic setting processing.

Among the aforementioned five methods including the method complying with the IEEE802.11i standard, a system may select one method, or may provide a communication parameter containing information indicating a method to be used. Alternatively, a system may dynamically switch the method depending on the mode of communication parameter automatic setting processing.

<7.2 Switching of Method>

Figure 16:
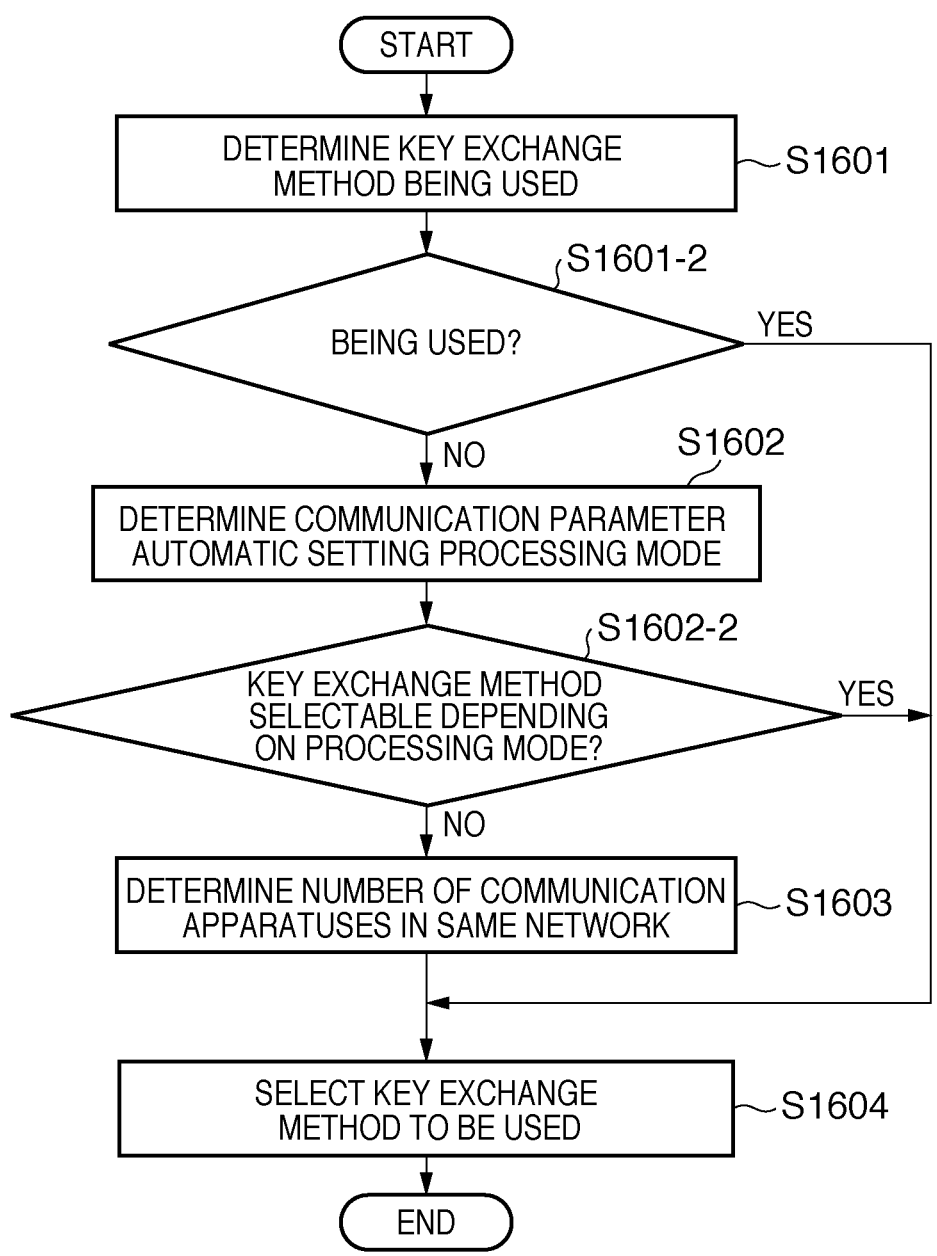
FIG. 16 is a flowchart illustrating a key exchange algorithm selection algorithm.

A case in which the method is dynamically switched depending on the mode of communication parameter automatic setting processing will be explained with reference to FIG. 16.

Assume that WPA-PSK or WPA2-PSK is selected, which needs to exchange a key as a communication parameter by communication parameter automatic setting processing. In this case, a key exchange method already used in a network is determined (step S1601). If it is determined in this determination process that a given key exchange method is already selected (YES in step S1601-2), that method is directly used. If no method is particularly selected (NO in step S1601-2), the processing mode of the communication parameter automatic setting processing is successively determined (step S1602).

This processing mode includes a processing mode in which communication parameters set by the communication parameter automatic setting processing are permanently used, and that in which the set communication parameters are used as temporary session information. In the processing mode in which the set communication parameters are permanently used (a mode in which the same communication parameters are used when wireless communication is performed again after turning off the power), a method (e.g., the first or fourth method) with higher security level is selected. On the other hand, in the mode in which the set communication parameters are used as temporary session information (a mode in which the set communication parameters are deleted or disabled after turning off the power), a method (e.g., the second or third method) which prioritizes the processing load over the security level may be selected.

If a key exchange method to be used is not determined according to the processing mode (NO in step S1602-2), the number of communication apparatuses existing in the same network is successively determined (step S1603). A key exchange method is selected depending on the number of communication apparatuses. If there exist two communication apparatuses, a method completely complying with the IEEE802.11i standard, or the first or fourth method may be selected. If there exist three or more communication apparatuses, the second or third method may be selected.

According to this embodiment, when the setting button of a communication apparatus belonging to a network is pressed, this communication apparatus becomes a provider to execute communication parameter providing processing. Upon start of an operation as a provider, the communication apparatus transmits a start notification message to another apparatus belonging to the network. Upon receiving a search signal from an apparatus which is to newly join the network, the other apparatus which has received the start notification message transmits a response signal containing information on the apparatus which has started the operation as a provider. The apparatus which has started the operation as a provider increases its beacon transmission frequency. The apparatus which has received the start notification message decreases its beacon transmission frequency. The apparatus which is to newly join the network, therefore, has a higher probability of reception of a beacon or search response signal from the provider. Consequently, the user can receive communication parameters by selecting an arbitrary communication apparatus with no regard to a provider or receiver among communication apparatuses belonging to the network.

That is, a communication apparatus can be newly added to the network by operating the setting button of an arbitrary communication apparatus without selecting a provider. Furthermore, it is possible to reduce the power consumption by beacon transmission by returning the increased beacon transmission frequency after the providing processing ends. Note that it is possible to more efficiently lower the power consumption by beacon transmission by returning the beacon transmission frequency immediately after the communication parameter providing processing starts.

When an apparatus newly joins a network after easily and securely providing communication parameters, the range of key exchange algorithm options is widened, and a key exchange algorithm is automatically determined and set. This can reduce the amount of work for a user in forming a network. It is thus possible to securely and readily form a network within a short time.

The embodiments of the present invention have been described above. This, however, is merely an example for explaining the present invention, and is not intended to limit the scope of the present invention. Various modifications can be made to the embodiments without departing from the spirit or scope of the present invention.

In each embodiment mentioned above, a case has been described in which the value of CW is changed to increase the number of times of beacon transmission per unit time by a provider as compared with another communication apparatus. The present invention, however, is not limited to this. Another parameter may be used as long as a provider can increase the number of times of beacon transmission as compared with another communication apparatus. For example, if the transmission interval of a beacon (beacon period) can be changed, it is possible to raise the number of times of beacon transmission per unit time by reducing the transmission interval of a beacon in a provider.

In the above explanation, CW is changed to be larger or smaller than the initial value. The initial values of CWs of communication apparatuses are not always equal to each other. Therefore, CW is changed to the minimum value (CWmin) or the maximum value (CWmax) of a change range, thereby reliably changing the beacon transmission frequency (the number of times of beacon transmission). Furthermore, the above explanation is given with regarding the start notification message as a message to notify that communication parameter automatic setting processing has started.

The start notification message may be a message to notify that the setting button 106 has been operated, and a message for allowing a provider to provide communication parameters for another receiver.

A wireless LAN complying with the IEEE802.11 standard has been explained above as an example. The present invention, however, may be implemented in another wireless medium such as wireless USB, MBOA, Bluetooth®, UWB, or ZigBee. The present invention may also be implemented in a wired communication medium such as a wired LAN.

Note that MBOA is an abbreviation for Multi Band OFDM Alliance. UWB includes wireless USB, wireless 1394, and WINET.

Although a network identifier, encryption method, encryption key, authentication method, and authentication key are used as examples of communication parameters, another information may be used and also included in communication parameters.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-222795, filed on Aug. 29, 2008 and No. 2008-282436, filed on Oct. 31, 2008, which are hereby incorporated by reference herein in their entirety.

The invention claimed is:

1. A communication method of a communication apparatus, the method comprising:
    determining, in response to a start instruction of communication parameter setting processing, whether the communication apparatus is currently a member of a wireless network;
    starting an operation as a provider which provides communication parameters to a receiver, according to the determination that the communication apparatus is currently a member of the wireless network;
    receiving information indicative of a second communication apparatus, which operates as a provider, from the second communication apparatus; and
    transmitting, in a case where the communication apparatus does not operate as the provider and does receive a provider search signal from a third communication apparatus, the received information to the third communication apparatus.

2. The method according to claim 1, further comprising:
    providing the receiver with communication parameters of the wireless network of which the communication apparatus is currently a member; and
    performing encryption key exchange processing with the receiver in response to end of the communication parameter providing processing.

3. The method according to claim 2, further comprising selecting a method to be used from a plurality of encryption key exchange processing methods in each of which at least one of the number of held encryption keys and the number of exchange sequences is different,
    wherein in the key exchange processing, the selected exchange processing method is executed.

4. The method according to claim 3, wherein a method to be used is selected depending on whether a processing mode is a mode in which the provided communication parameters are temporarily used.

5. The method according to claim 3, wherein an encryption key exchange processing method to be used is selected depending on the number of communication apparatuses on the wireless network of which the communication apparatus is currently a member.

6. A communication apparatus comprising:
    a determination unit configured to determine, in response to a start instruction of communication parameter setting processing, whether the communication apparatus is currently a member of a wireless network;
    a start unit configured to start an operation as a provider which provides communication parameters to a receiver, according to the determination that the communication apparatus is currently a member of the wireless network by the determination unit;

a reception unit configured to receive information indicative of a second communication apparatus, which operates as a provider, from the second communication apparatus; and a response unit configured to transmit, in a case where the communication apparatus does not operate as the provider and does receive a provider search signal from a third communication apparatus, the information received by the reception unit to the third communication apparatus.

7. The communication apparatus according to claim 6, further comprising:

a providing unit configured to provide the receiver with communication parameters of the wireless network of which the communication apparatus is currently a member; and a key exchange unit configured to perform encryption key exchange processing with the receiver in response to end of the communication parameter providing processing by the providing unit.

8. The communication apparatus according to claim 7, further comprising a selection unit configured to select a method to be used from a plurality of encryption key exchange processing methods in each of which at least one of the number of held encryption keys and the number of exchange sequences is different, wherein the key exchange unit executes the exchange processing method selected by the selection unit.

9. The communication apparatus according to claim 8, wherein the selection unit selects a method to be used depending on whether a processing mode is a mode in which the communication parameters provided by the providing unit are temporarily used.

10. The communication apparatus according to claim 8, wherein the selection unit selects an encryption key exchange processing method to be used depending on the number of communication apparatuses on the wireless network of which the communication apparatus is currently a member.

11. The communication apparatus according to claim 6, wherein the communication parameters are for communication by a wireless LAN complying with IEEE802.11 standard series.

12. The communication apparatus according to claim 6, wherein the communication parameters comprise at least one of a network identifier, an encryption method, an encryption key, an authentication method, or an authentication key.

13. A non-transitory computer-readable storage medium storing a computer program which, when executed by a computer, is configured to perform operations of a communication apparatus comprising:

a determination unit configured to determine, in response to a start instruction of communication parameter setting processing, whether the communication apparatus is currently a member of a wireless network;

a start unit configured to start an operation as a provider which provides communication parameters to a receiver, according to the determination that the communication apparatus is currently a member of the wireless network by the determination unit;

a reception unit configured to receive a information indicative of a second communication apparatus, which operates as a provider, from the second communication apparatus; and a response unit configured to transmit, in a case where the communication apparatus does not operate as the provider and does receive a provider search signal from a third communication apparatus, the information received by the reception unit to the third communication apparatus.

* * * * *